(12) United States Patent
Maziere et al.

(10) Patent No.: US 10,135,231 B2
(45) Date of Patent: Nov. 20, 2018

(54) CONNECTOR FOR AN ELECTRICAL DEVICE HOUSED IN A RECESSED BOX

(71) Applicants: LEGRAND FRANCE, Limoges (FR); LEGRAND SNC, Limoges (FR)

(72) Inventors: Laurent Maziere, Feytiat (FR); Jean-Loup Caille, Peyrilhac (FR); Jerome Longeville, Panazol (FR); Jean-Luc Chaumeny, Saint Just le Martel (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 0 days.

(21) Appl. No.: 15/306,602

(22) PCT Filed: Apr. 23, 2015

(86) PCT No.: PCT/FR2015/051103
§ 371 (c)(1),
(2) Date: Oct. 25, 2016

(87) PCT Pub. No.: WO2015/166170
PCT Pub. Date: Nov. 5, 2015

(65) Prior Publication Data
US 2017/0047719 A1 Feb. 16, 2017

(30) Foreign Application Priority Data

Apr. 28, 2014 (FR) .................................... 14 53832

(51) Int. Cl.
*H02G 3/12* (2006.01)
*H02G 1/14* (2006.01)
(Continued)

(52) U.S. Cl.
CPC ............... *H02G 3/12* (2013.01); *H01R 13/73* (2013.01); *H02G 1/14* (2013.01); *H02G 3/123* (2013.01); *H02G 3/16* (2013.01)

(58) Field of Classification Search
CPC .................................. H01R 13/73; H02G 1/14
See application file for complete search history.

(56) References Cited

U.S. PATENT DOCUMENTS 3,879,101 A   4/1975  McKissic
4,847,444 A   7/1989  Holland
(Continued)

FOREIGN PATENT DOCUMENTS

DE           9106123       8/1991
DE    20 2007 012 109 U1  11/2007
EP         2 068 411 A1    6/2009

OTHER PUBLICATIONS

International Search Report, dated Aug. 5, 2015, from corresponding PCT Application.

*Primary Examiner* — William H Mayo, III
*Assistant Examiner* — Hiram E Gonzalez
(74) *Attorney, Agent, or Firm* — Young & Thompson

(57) ABSTRACT

A connector (1) adapted to connect at least one electrical conductor to an electrical accessory that is intended to be housed in an electrical box (200) for flush mounting in a wall (300), the connector including:
a base (10) that defines an inlet opening for the electrical conductor; and
at least one connection element that is fastened to the base and that includes an inlet terminal for connecting the electrical conductor, and an outlet terminal that is accessible via the front of the base for connecting the electrical accessory. The connector includes at least two distinct arms (14, 16) that extend from the base,
(Continued)

towards the front, and having free ends that present catch elements (15, 17) for catching on the wall.

39 Claims, 17 Drawing Sheets

(51) Int. Cl.
*H01R 13/73* (2006.01)
*H02G 3/16* (2006.01)

(56) References Cited

U.S. PATENT DOCUMENTS

| 7,052,313 | B2* | 5/2006 | Gorman | H01H 11/0006 |
| | | | | 174/53 |
| 8,497,424 | B2* | 7/2013 | Castaldo | H02G 3/081 |
| | | | | 174/50 |
| 2014/0054286 | A1* | 2/2014 | Kummer | H02G 3/12 |
| | | | | 220/3.9 |

* cited by examiner

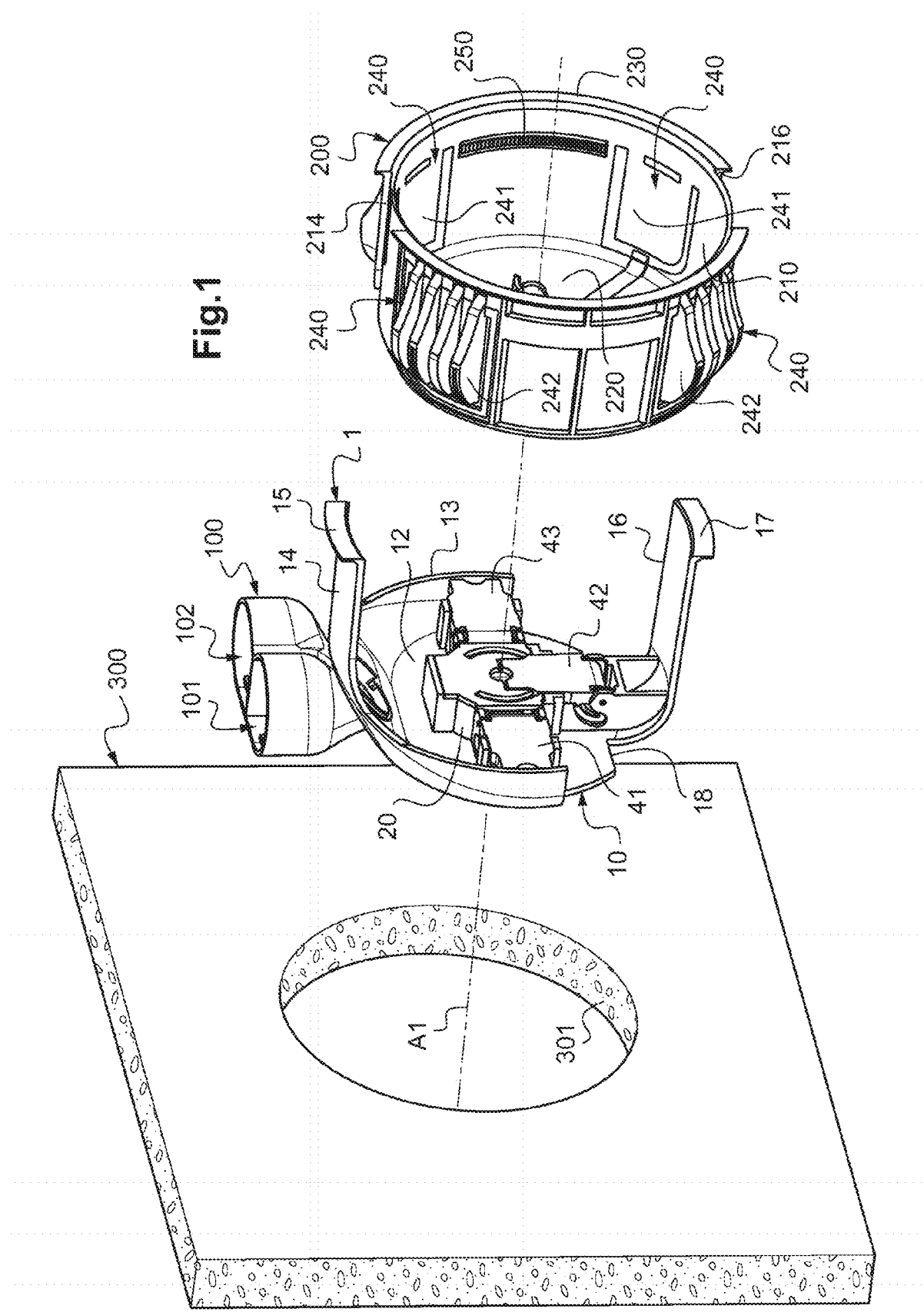

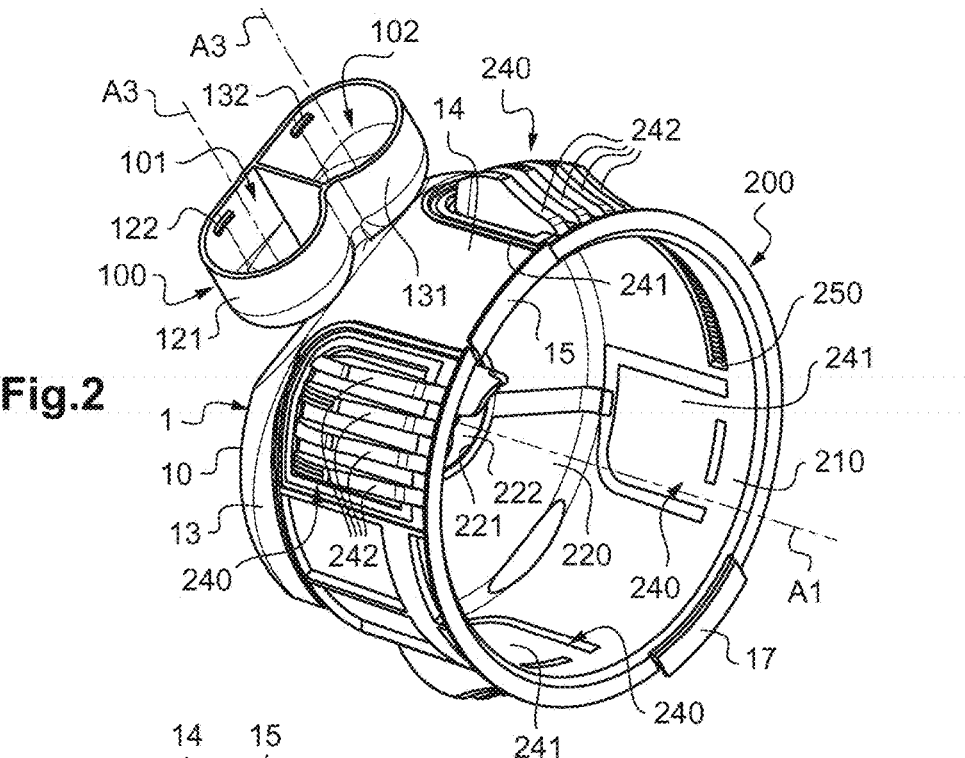
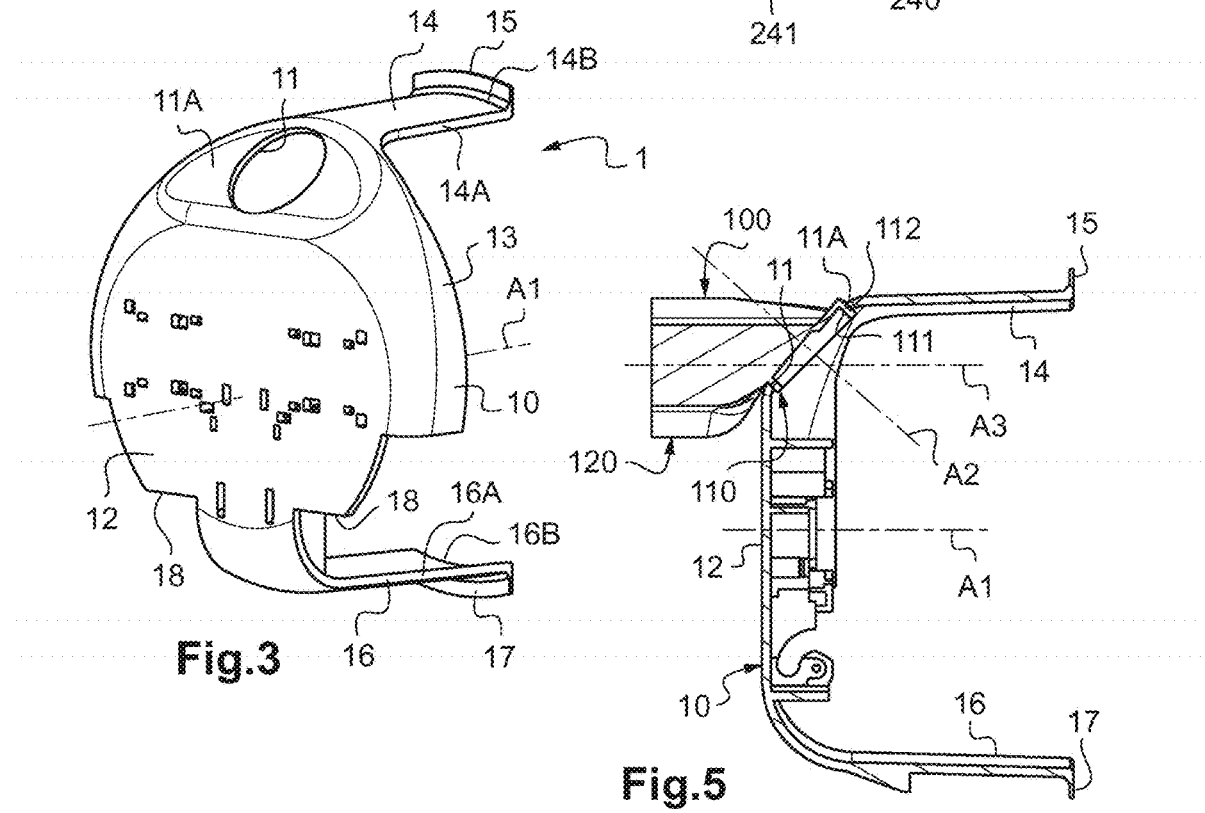

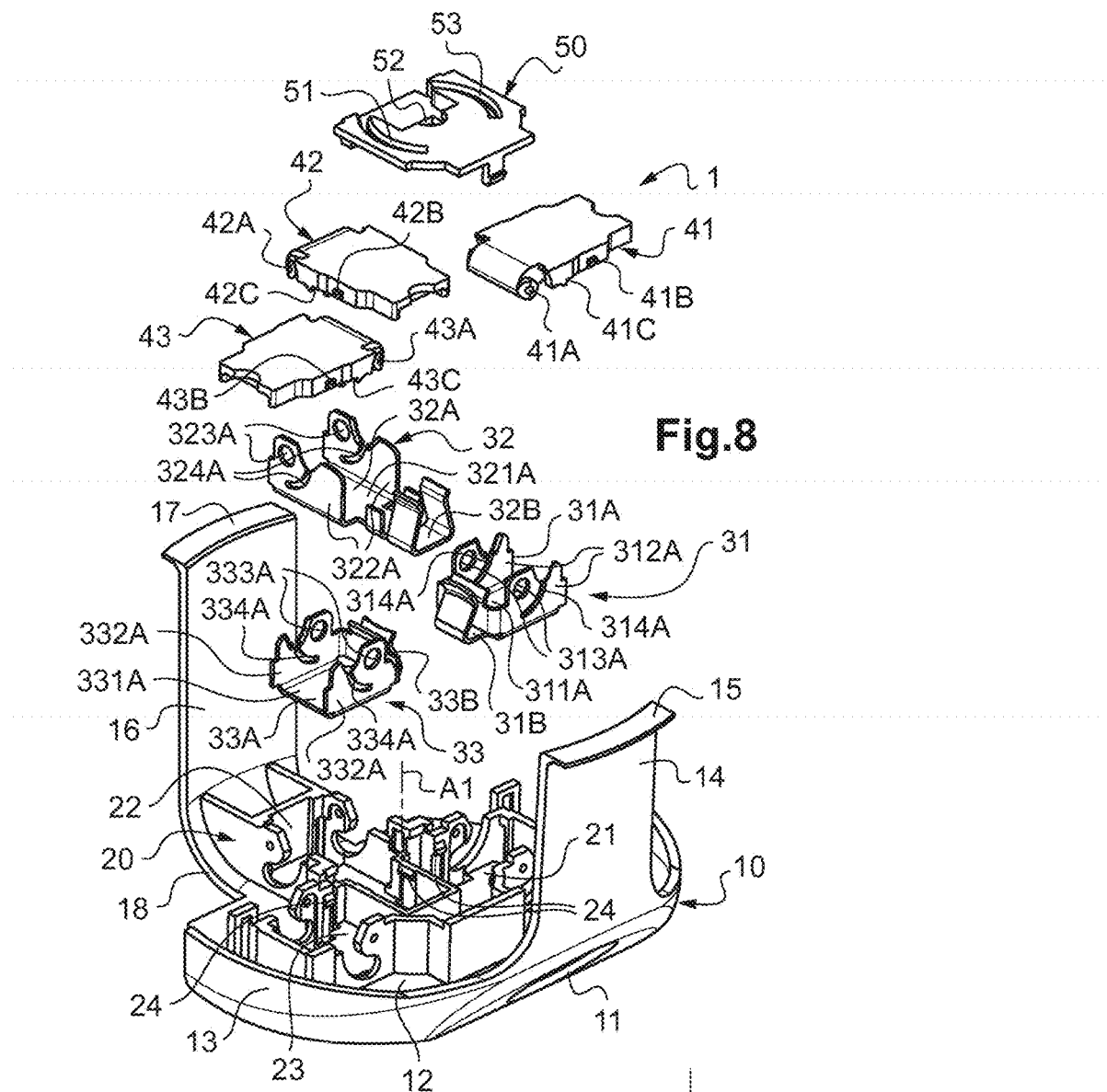
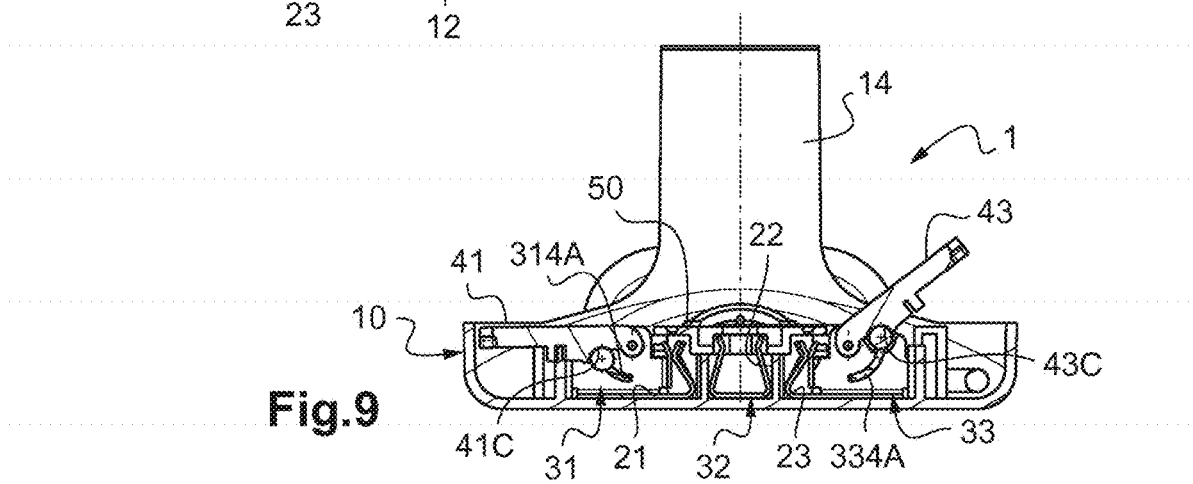

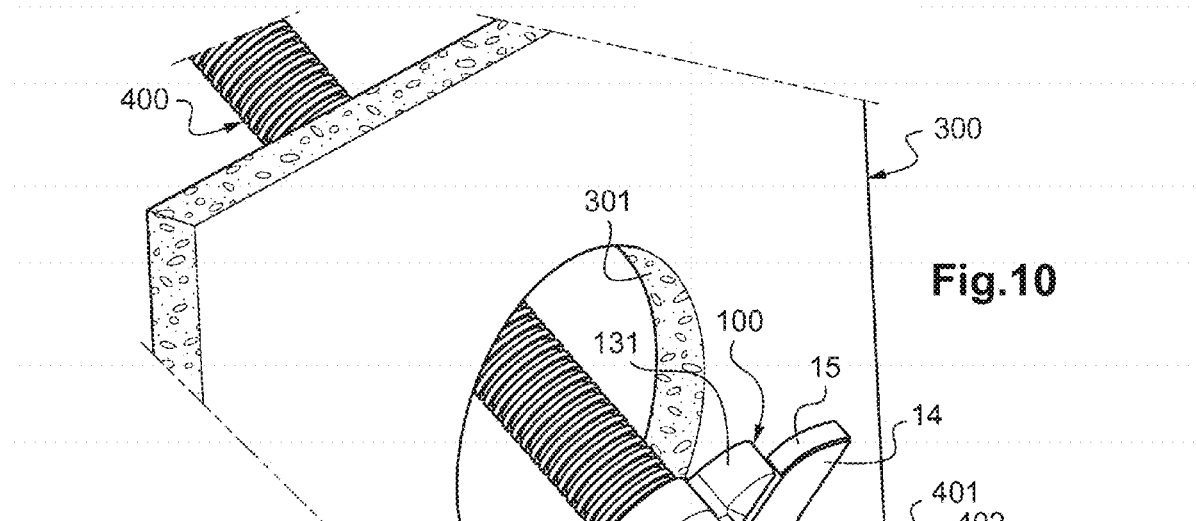
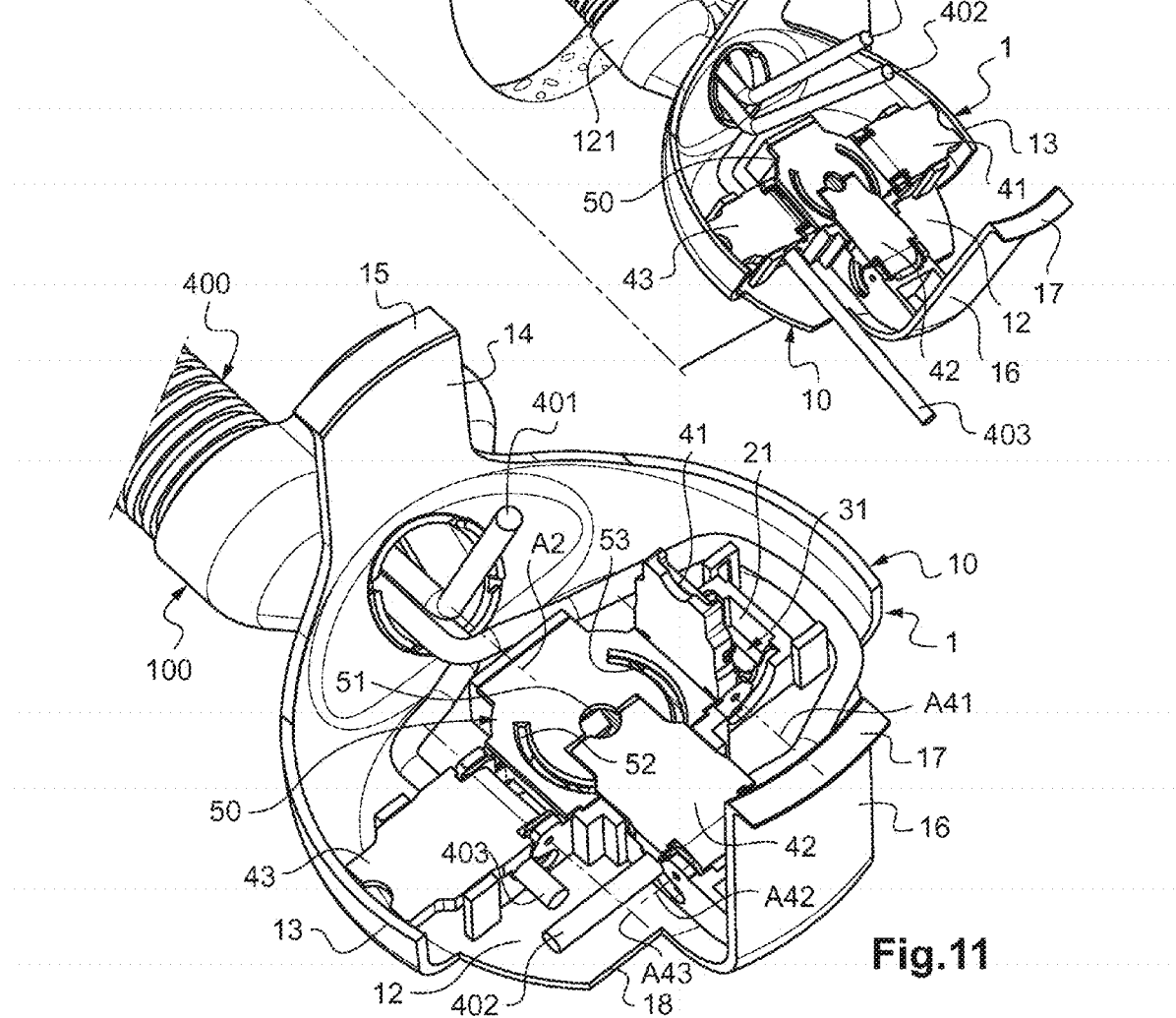

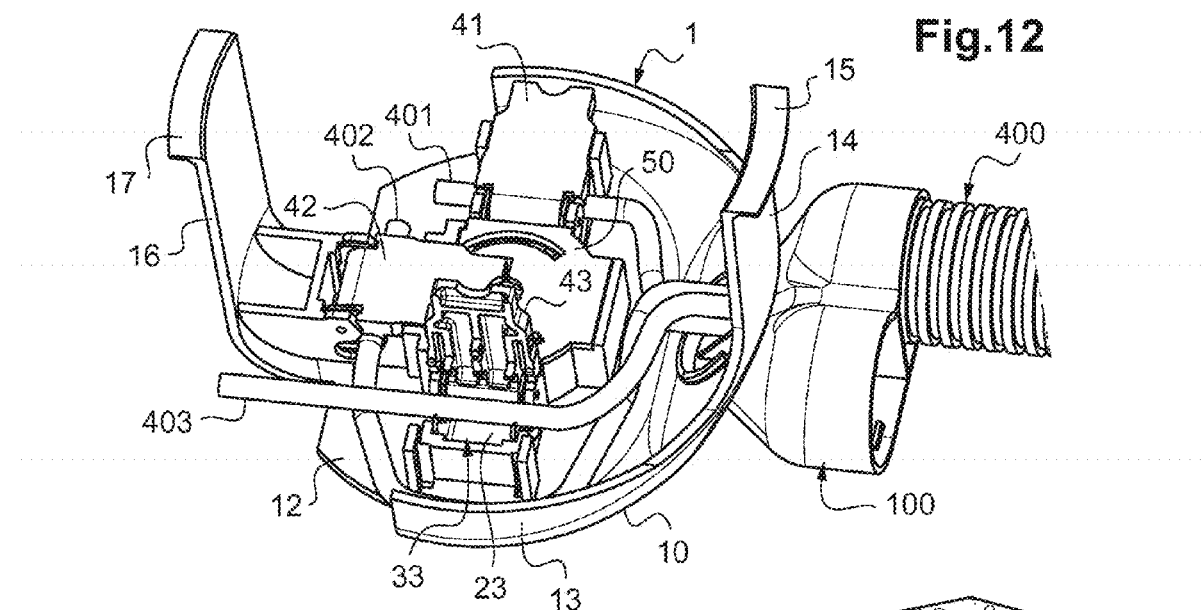
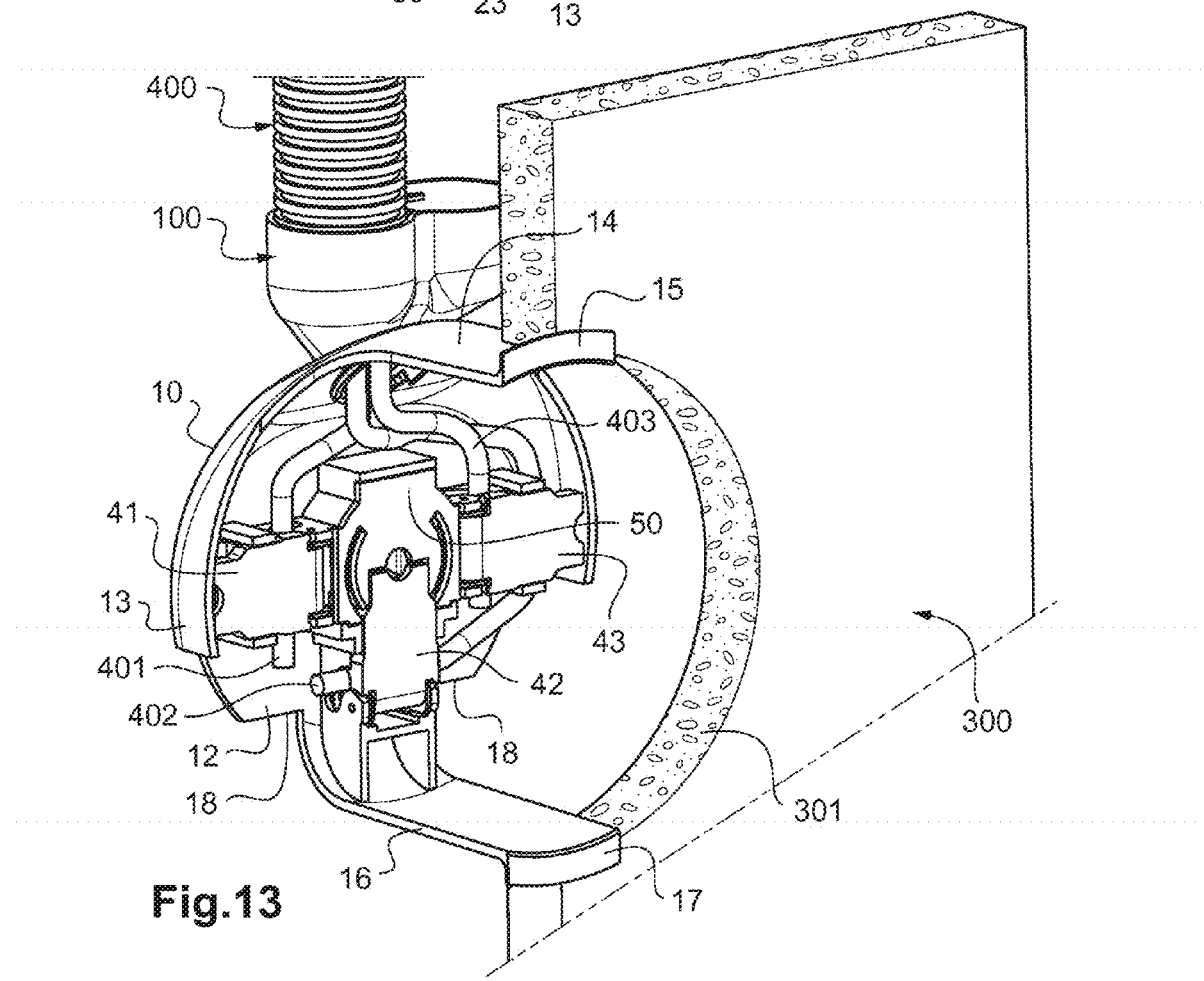

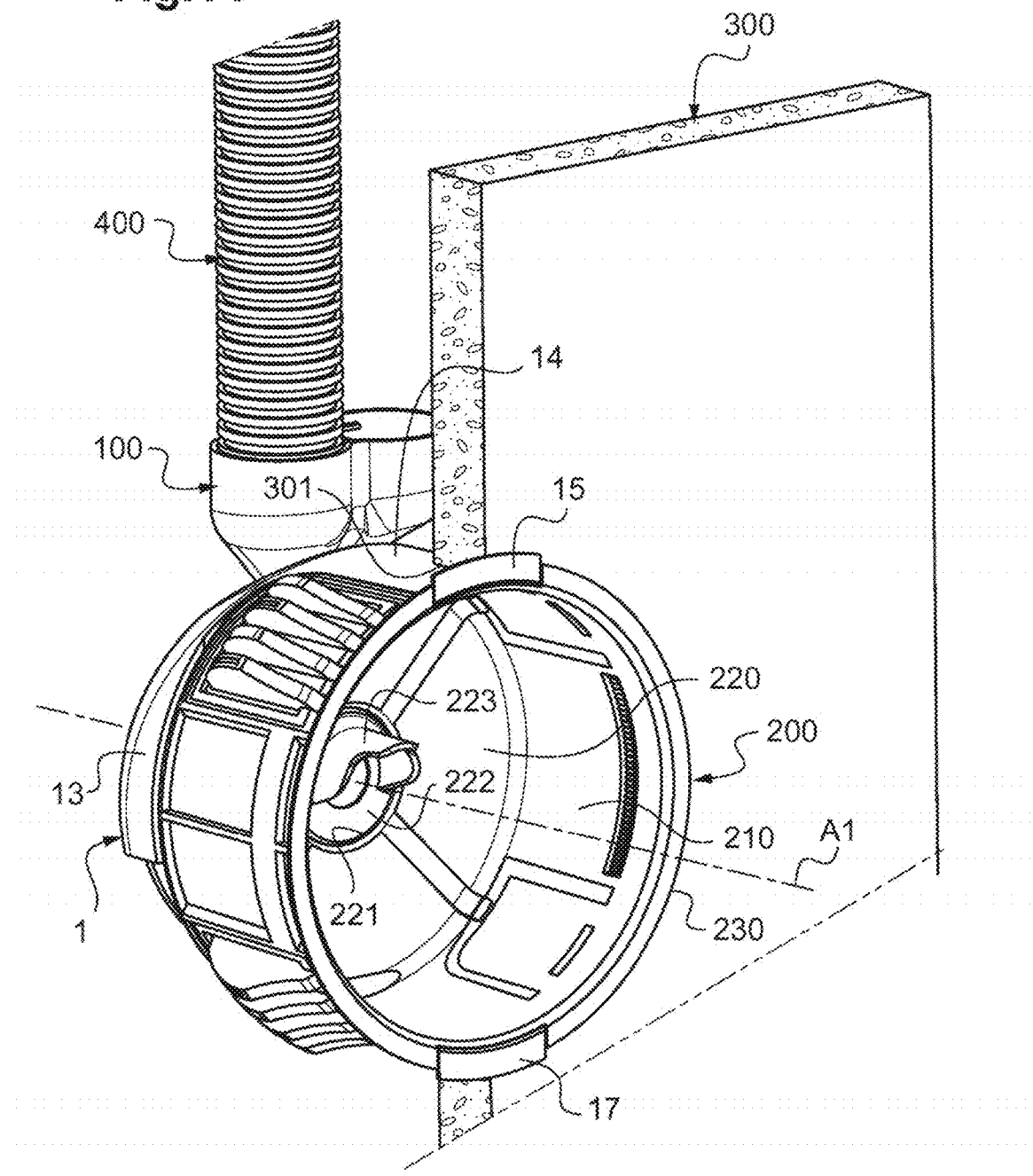

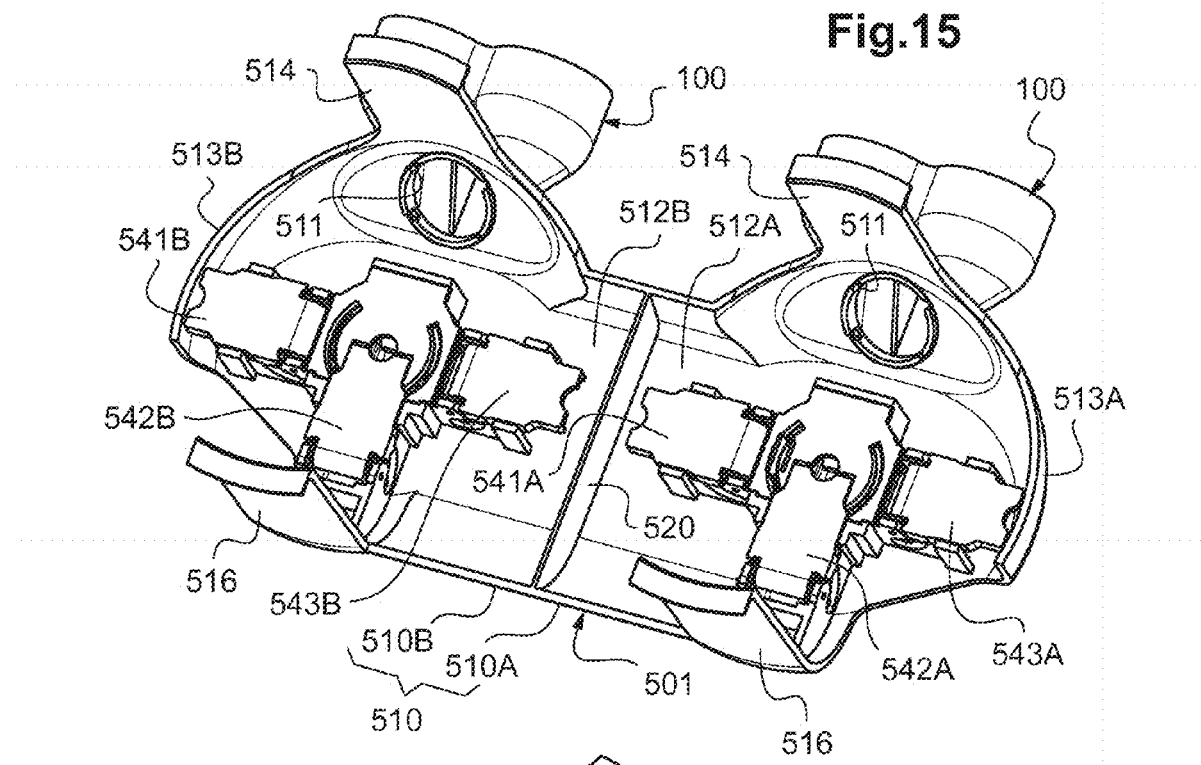
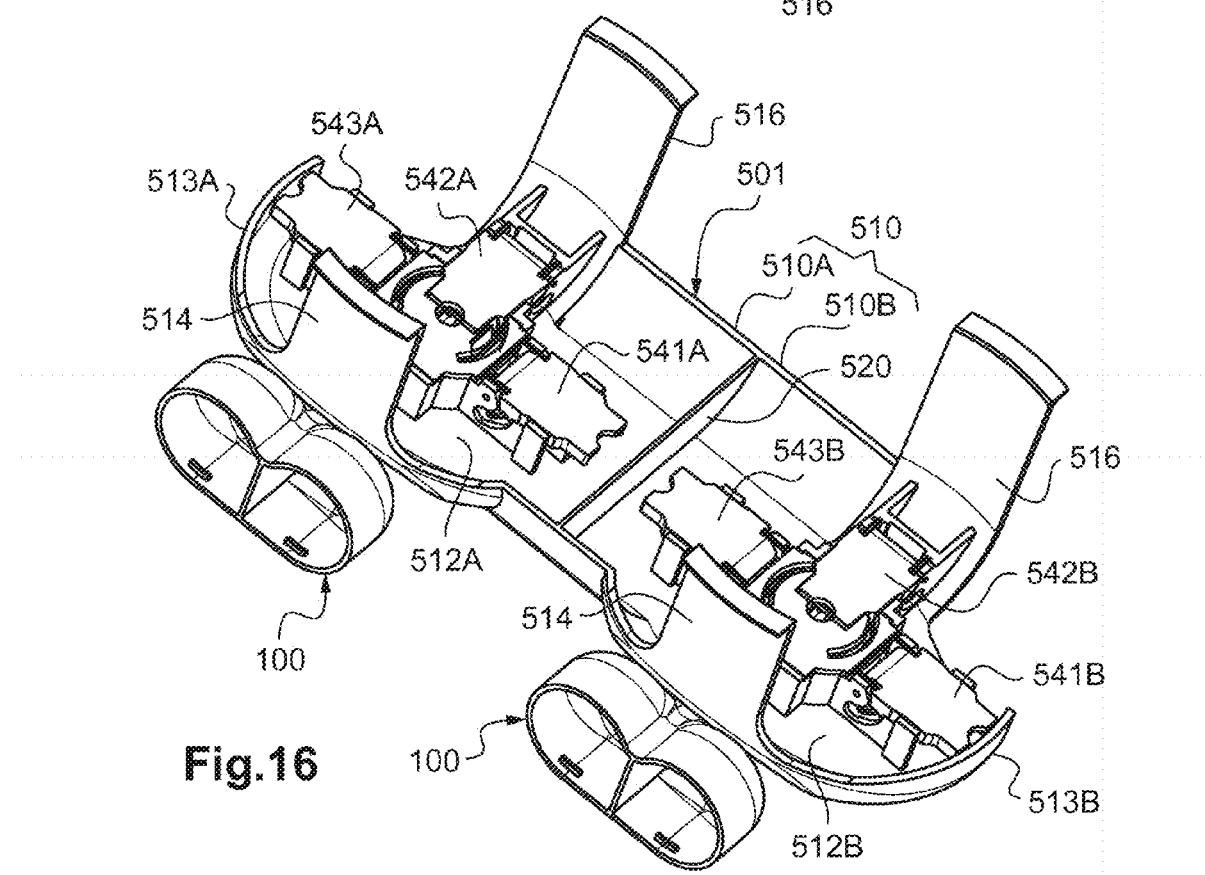

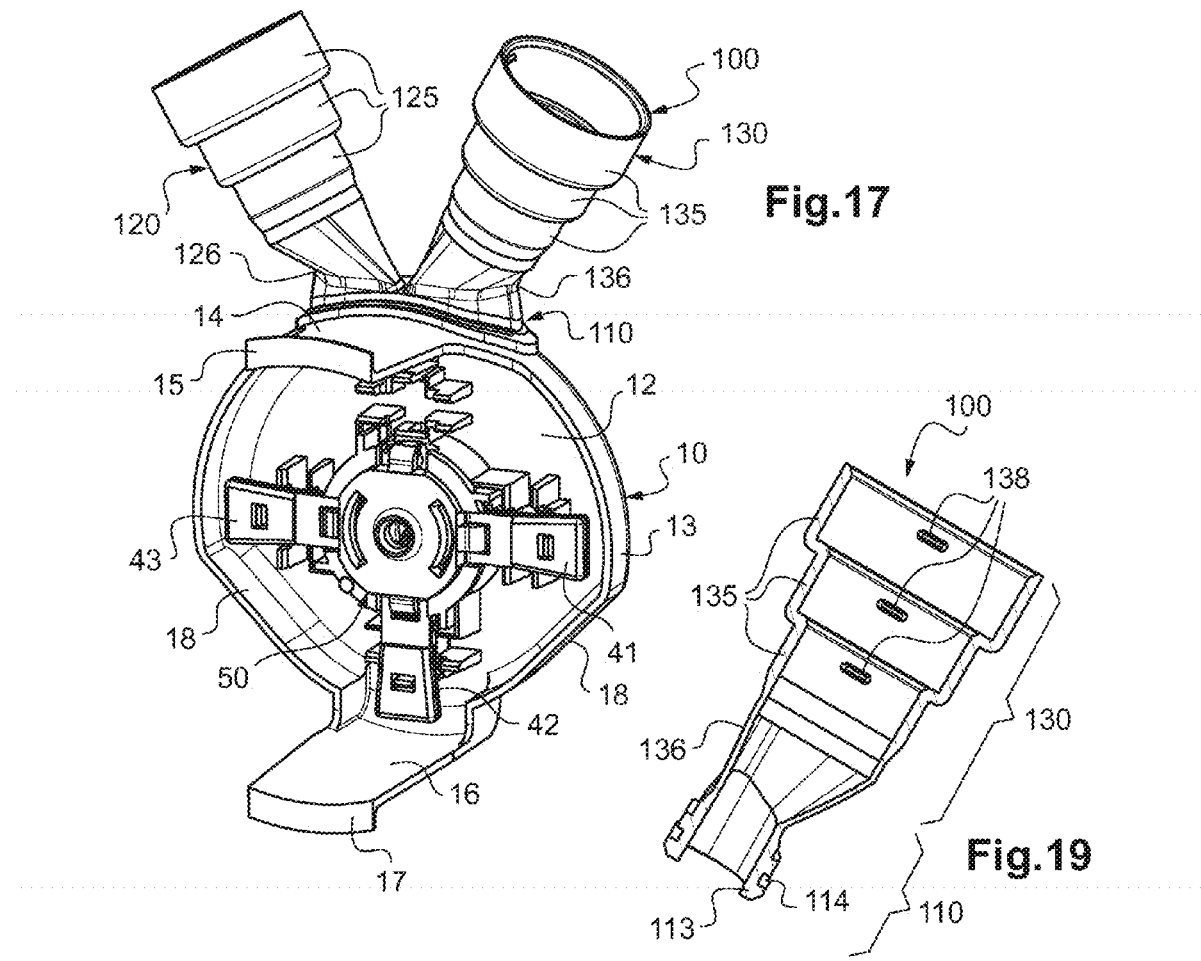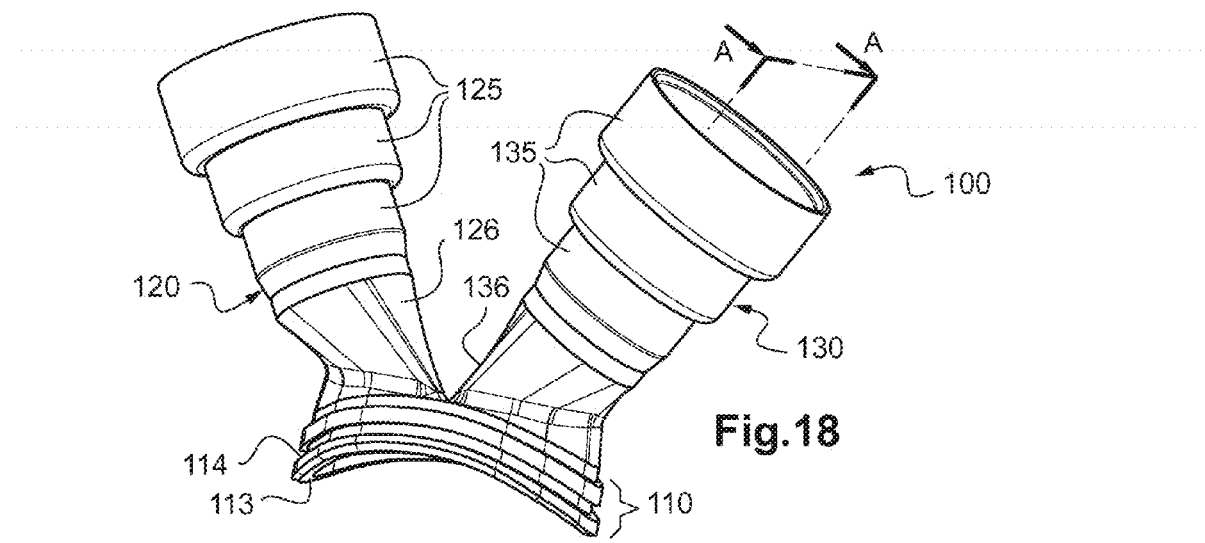

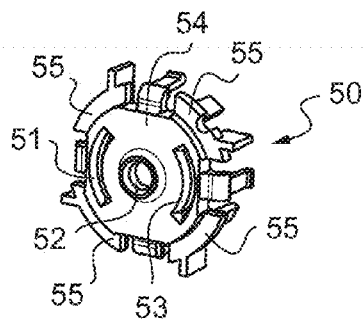
Fig.20
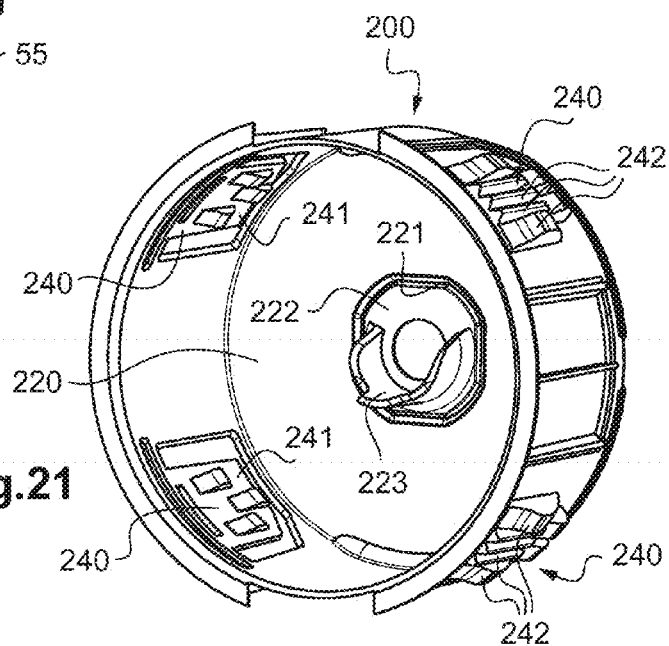
Fig.21
Fig.22
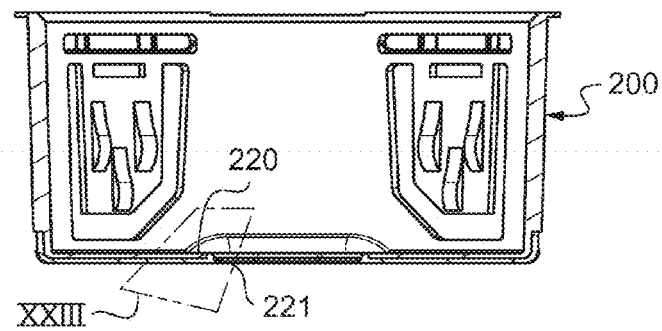
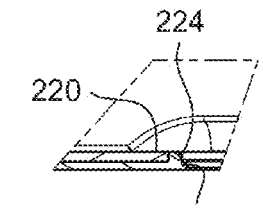
Fig.23

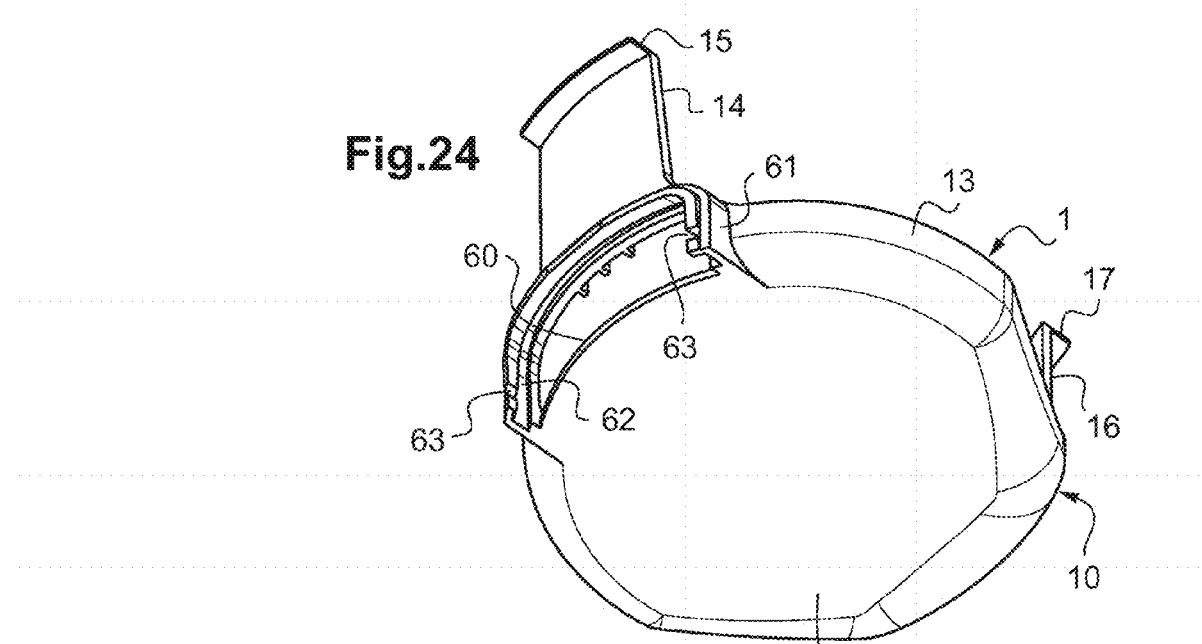
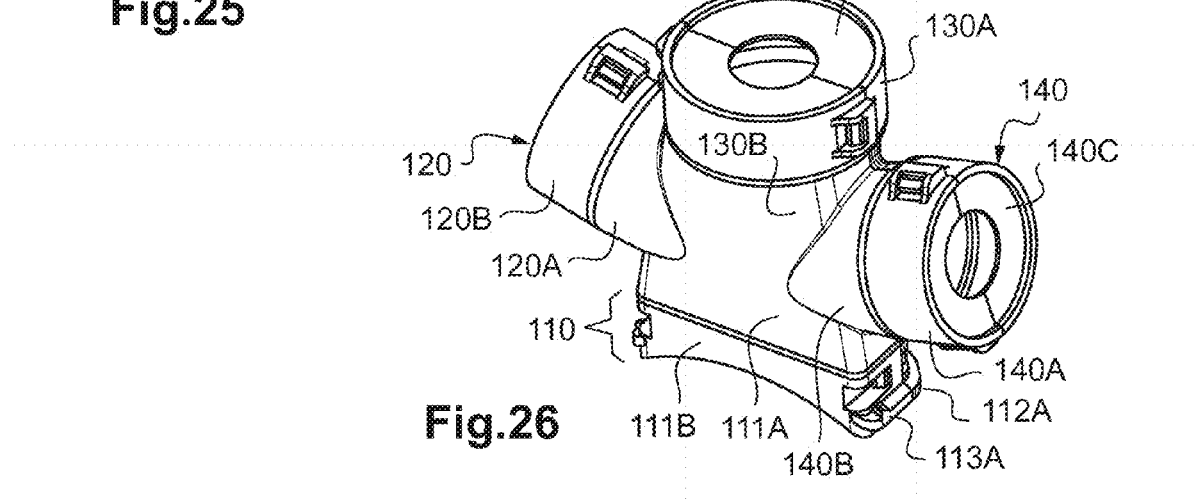

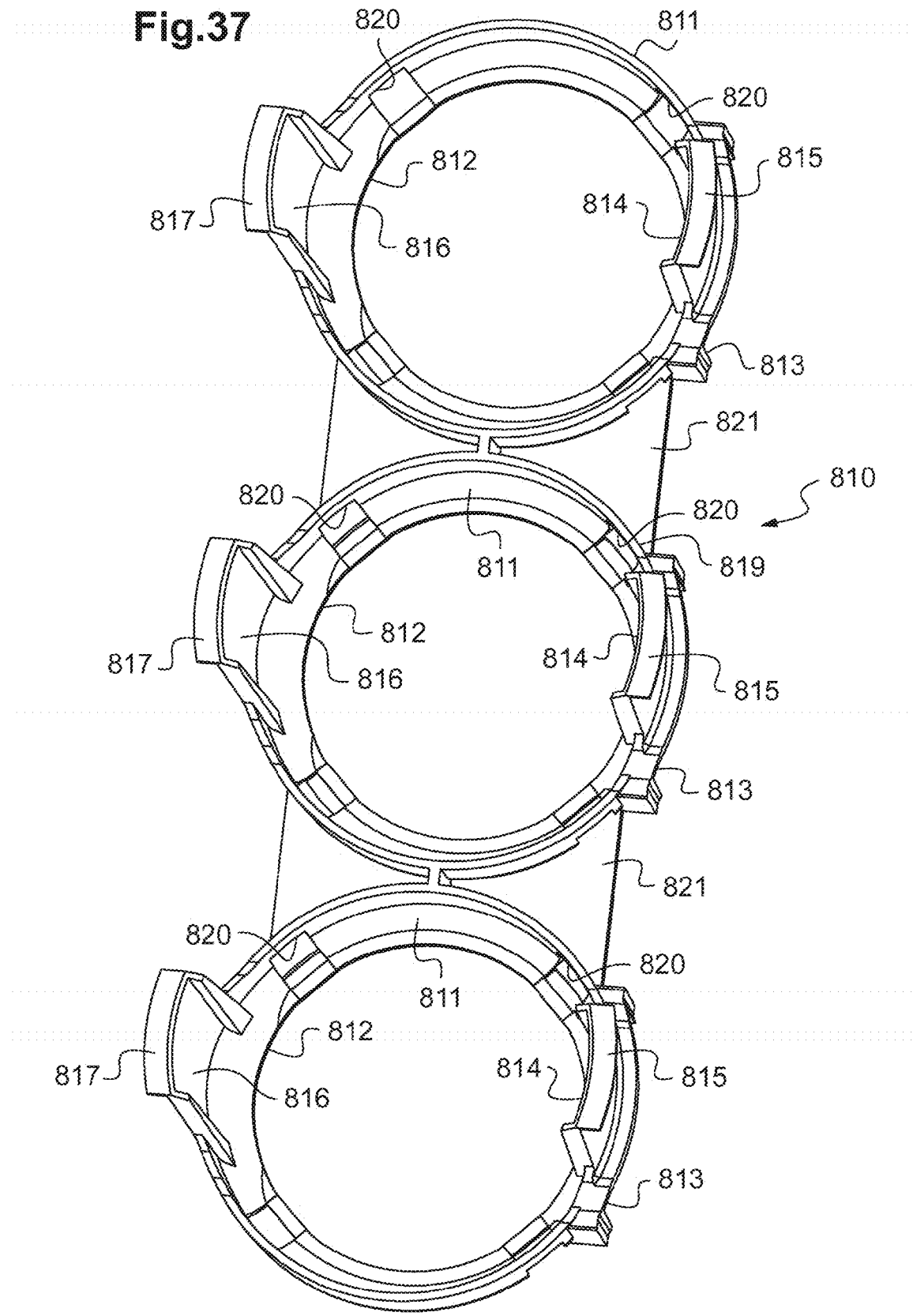

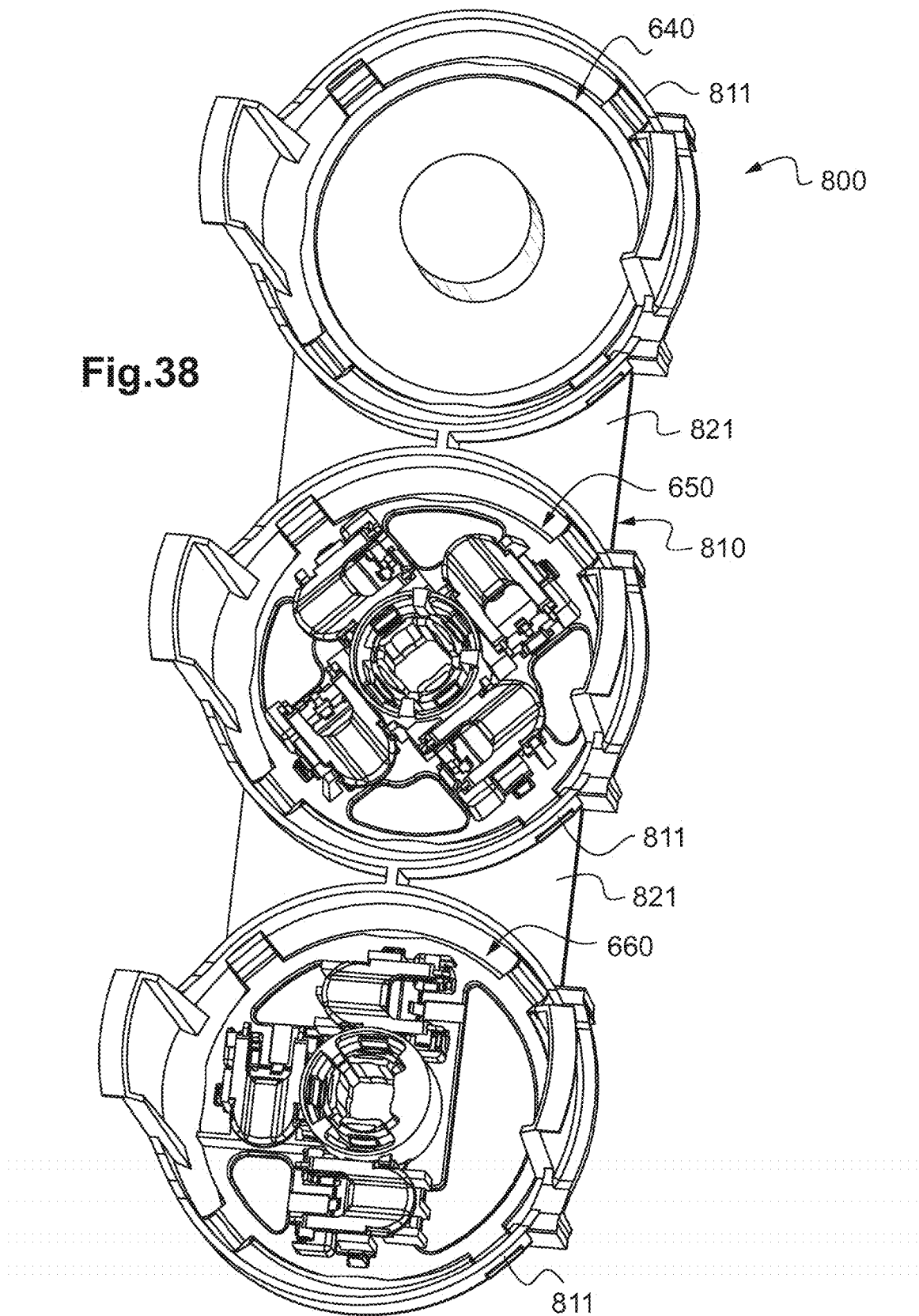

CONNECTOR FOR AN ELECTRICAL DEVICE HOUSED IN A RECESSED BOX

TECHNICAL FIELD TO WHICH THE INVENTION RELATES

The present invention generally relates to putting an electrical accessory in an electrical box for flush mounting in a wall and to connecting the electrical accessory.

It relates more particularly to a connector, comprising:
a base that defines an inlet opening for at least one electrical conductor, and that presents a front edge; and
at least one connection element that is fastened to the base and that includes an inlet terminal for connecting said electrical conductor, and an outlet terminal that is accessible via the front of the base for connecting said electrical accessory.

It also relates to an assembly comprising:
a connector as mentioned above; and
an electrical box for receiving an electrical accessory and including a side wall that is closed at the rear by a rear wall presenting at least one access opening for accessing the outlet terminals of the connection elements of the connector.

TECHNOLOGICAL BACKGROUND

Generally, an electrical box includes internal securing means for securing an electrical accessory, and includes external fastener means for fastening to a wall.

An ordinary electrical box further includes, in its rear portion, knock-out diaphragms that make it possible to open the rear wall of the box locally so as to insert, into its inside volume, routing conduits from which there emerge the electrical conductors necessary for serving the electrical accessory.

Electrical boxes present sizes that are standard. Thus, currently, a circular electrical box for flush mounting presents a standard diameter of 68 millimeters (mm) and usually a depth of 40 mm.

The inside volume of such an electrical box is thus small and it is awkward to house therein not only the electrical accessory, but also the end of the routing conduit and the ends of the electrical conductors that have been pulled into the inside volume of the electrical box, in particular because of the stiffness of the electrical conductors that need to be bent between the electrical accessory and the rear wall of the box.

In addition, the small inside volume restricts any possible development of electrical accessories that are prevented from incorporating all of the functions that might be desired, because of their limited size.

A solution currently used for housing voluminous electrical accessories thus consists in providing two electrical boxes side by side, with one housing the electrical accessory, while the other houses the electrical conductors.

However, that solution turns out to be costly and tricky to implement.

Another solution is described in document EP 2 068 411. That other solution consists in using an electrical box that has a slot formed in its rear wall through which it receives a connector that is adapted to make it easier to connect the electrical accessory to the electrical conductors that protrude from the routing conduit. For this purpose, the connector includes electrical terminals that are accessible from the inside of the box for connecting the electrical accessory, and a cable portion for connecting to the electrical conductors.

That solution avoids having to insert the electrical conductors and the routing conduits into the inside volume of the electrical box, thereby making it possible to make more space available for the electrical accessory.

The major drawback of that solution is that it does not make it possible to block the end of a routing conduit against the box. That solution thus requires either the entire electrical installation to be made with electric cables of the type having insulated electric wires embedded in a common insulating sheath (which turns out to be more expensive than using routing conduits through which insulated electric wires can be drawn freely), or else expensive means to be provided for creating a connection piece between the electric cable and a routing conduit.

In addition, document U.S. Pat. No. 3,879,101 discloses an electrical accessory for engaging in a flush-mounted box in the rear wall of which a cable inlet opening is provided. The electrical accessory is made of two portions, having a functional portion at the front and a connection portion at the rear.

In that document, the rear connection portion makes it easier to change the front connection portion, but it does not make it possible to increase the volume available inside the box for fitting voluminous mechanisms therein. Specifically, it is still necessary to provide space inside the box for connecting the electric wires to the connection portion.

OBJECT OF THE INVENTION

In order to remedy the above-mentioned drawbacks of the prior art, the present invention proposes a solution that firstly avoids having to insert the electrical conductors and the routing conduits inside the inside volume of the electrical box, and that secondly makes it easy both to mount the electrical box in the wall and also to remove it therefrom.

More particularly, the invention proposes a connector as defined in the introduction, which connector includes two distinct arms that extend from the base, mainly at the front of the front edge of the base, and having free ends that present catch means for catching on the wall.

Thus, the connector is provided so as to be fastened, not to the electrical box, but rather to the wall itself. It is thus suitable for being put in place before the electrical box. Once in place, it can receive the electrical box between its arms.

As a result, by means of the invention, it is possible to remove the electrical box from the wall without also taking out the routing conduits and the electrical conductors, since they are fastened to the connector. The box can thus be removed from the wall or engaged therein without difficulty.

Another advantage of the connector is that, when it is in place in the wall, it leaves access to the routing conduits via the space situated between the base and the wall. It is thus possible to push the routing conduits in the desired direction, which makes it easier to install the connector.

In addition, since the routing conduits are connected on the connector, the electrical box makes it possible to provide thermal insulation between the inside and the outside of the wall so as to satisfy the standards in force (in France, the low energy-consumption building standards (known as "bâtiment à basse consommation" (BBC)).

The connector also presents the advantage of providing electrical insulation that is good since, in the absence of an electrical accessory inside the electrical box, the electrical-connection terminals of the connector remain hidden at the rear of the electrical box.

Preferably, the rear wall is bordered at the front by a peripheral rim, and the arms are situated in alignment with the peripheral rim.

The invention also provides a connector comprising a base made of two portions.

In this embodiment, there are provided both a support (that carries the arms) and also a cartridge (that carries the connection elements). The cartridge is separable from the support, so that it is possible to use the same support for different applications, by associating it with particular cartridges respectively corresponding to desired applications.

More particularly, the invention proposes a support comprising:
- a peripheral wall that defines at least one main opening for receiving a cartridge, that defines at least one side notch or inlet opening for at least one electrical conductor, and that presents a front edge;
- catch means for catching said cartridge in said main opening; and
- at least two distinct arms that extend from the peripheral wall, mainly at the front of the front edge of the peripheral wall, and having free ends that present catch means for catching on the wall.

In a particular embodiment of the invention, the peripheral wall defines at least two identical main openings, and at least three distinct arms are provided.

Preferably, said catch means are unlockable snap-fastener means that make it easier to replace a rear wall with another.

The invention also proposes a cartridge comprising:
- a rear wall;
- catch means for catching the rear wall on a support; and
- at least one connection element that is fastened to the rear wall and that includes an inlet terminal for connecting an electrical conductor, and an outlet terminal that is accessible via the front of the rear wall for connecting at least one electrical accessory.

Other characteristics of the connector of the invention that are advantageous and non-limiting are as follows:
- only two arms are provided, situated opposite each other relative to the center of the base;
- the arms project in parallel directions from the edge of the base;
- said inlet opening is situated in alignment with a first of the arms;
- said peripheral rim includes two notches that are situated on either side of a second of the two arms and that are contiguous with the second arms;
- said catch means are formed by the free ends of the arms, which free ends are curved outwards;
- an endpiece is provided that defines at least one passage for passing said electrical conductor, and that includes a mounting portion for mounting it on the base, on the axis of said inlet opening, and at least one securing portion for securing a routing conduit that houses said electrical conductor;
- the mounting portion comprises a tubular duct that externally presents a peripheral groove that is engaged on the edge of the inlet opening of the base;
- the mounting portion comprises a tubular duct and at least two snap-fastener tabs that are adapted to catch on the edge of the inlet opening of the base;
- the mounting portion is shaped to allow the endpiece at least one freedom to move in pivoting relative to the base, about an axis that slopes relative to the axes on which the arms extend;
- the mounting portion is shaped to co-operate with said inlet opening to form a ball-and-socket connection;
- the base includes indexer means for blocking the pivoting of the endpiece relative to the base;
- the mounting portion is shaped so as to block the endpiece in stationary manner relative to the base, and each securing portion includes a junction zone at said mounting portion that is flexible manually;
- each tubular duct comprises a flexible portion that is extended at its free end by a rigid collar;
- the mounting portion includes slide means that make it possible to bring the endpiece onto the axis of the inlet opening, and snap-fastener teeth that make it possible to block the endpiece in this position relative to the inlet opening;
- each securing portion comprises a tubular duct that is provided internally with holder means for holding the routing conduit;
- two distinct securing portions are provided;
- the tubular ducts of the two securing portions extend side-by-side, parallel to each other;
- each securing portion comprises a succession of tubes of different diameters;
- said endpiece is formed as a single piece by molding;
- the base includes a rear wall that, on its front face, carries partitions, the partitions defining insulated reception housings that receive said connection elements;
- the inlet terminal of each connection element presents at least one slot having edges that are sharp so as to cut the insulation of the electrical conductors;
- the inlet terminal of each connection element is fitted with an operating lever that is adapted to force the electrical conductor into said slot;
- each operating lever is mounted to pivot about an axis that is parallel to the rear wall;
- in orthogonal projection onto the plane of the front face of the rear wall, the pivot axis of at least one operating lever and the axis of the inlet opening are parallel;
- a plurality of connection elements are provided that are arranged in such a manner that their outlet terminals are contiguous, and that their inlet terminals are situated at a distance from one another; and
- the base defines at least two distinct stations in each of which an inlet opening and at least two connection elements are provided, and at least three distinct arms are provided.

The invention also proposes an assembly as defined in the introduction, which assembly comprises a connector as mentioned above, and an electrical box having a side wall that externally presents at least two grooves for passing the arms of the connector.

Thus advantageously, said access opening is closed by a diaphragm that is detachable or can be knocked out.

Advantageously, the edge of said access opening is covered by a sealing gasket.

Also advantageously, said diaphragm is overmolded on a portion of the rear wall so as to present firstly a bulge that extends internally around the edge of said access opening so as to form said sealing gasket, and secondly a breakable line of weakness that internally extends the edge of said bulge.

Preferably, the side wall of the electrical box is bordered at the front by an outer collar that is interrupted for passing the arms of the connector.

The invention also relates to a method of mounting a connector as according mentioned above in a cavity formed in a wall, the method comprising the steps consisting in:
- threading an electrical conductor through the inlet opening of the base of the connector;

connecting said electrical conductor to the inlet terminal of the connection element of the connector; and engaging the base in said cavity in such a manner that the catch means provided at the ends of the arms catch on the wall.

The invention also relates to a method of mounting an assembly as mentioned above in a cavity formed in a wall, the method comprising:

a step of mounting the connector in said cavity in accordance with the above-mentioned method; then a step of mounting the electrical box in said cavity, by engaging the grooves provided in the side wall of the electrical box on the arms of the connector so that the access opening provided in said rear wall is positioned facing the outlet terminals of the connection elements of the connector.

DETAILED DESCRIPTION OF AN EMBODIMENT

The following description of non-limiting examples given with reference to the accompanying drawings, makes it possible to understand what the invention consists of and how it can be reduced to practice.

In the accompanying drawings:

FIG. 1 is an exploded diagrammatic perspective view of a connector in a first embodiment of the invention, and of an electrical box for fitting in a wall;

FIG. 2 is a diagrammatic perspective view of the FIG. 1 connector and electrical box assembled together;

FIG. 3 is a diagrammatic rear view in perspective of the base of the FIG. 1 connector;

FIG. 5 is a diagrammatic section view of the endpiece and of the base of the FIG. 1 connector;

FIG. 8 is an exploded diagrammatic perspective view of the base, the connection elements, and the operating levers of the FIG. 1 connector;

FIG. 9 is a diagrammatic section view of the FIG. 1 connector;

FIGS. 10 to 14 show various steps for mounting the connector and the electrical box in the FIG. 1 wall;

FIGS. 15 and 16 are diagrammatic perspective views of a variant embodiment of the FIG. 1 connector;

FIG. 17 is a diagrammatic perspective view of a variant embodiment of the FIG. 1 connector;

FIG. 18 is a diagrammatic perspective view of the endpiece of the FIG. 17 connector;

FIG. 19 is a section view on plane A-A in FIG. 18;

FIG. 20 is a diagrammatic perspective view of the cap of the FIG. 17 connector;

FIG. 21 is a diagrammatic perspective view of a variant embodiment of the FIG. 1 electrical box;

FIG. 22 is section view of the FIG. 21 electrical box;

FIG. 23 is a view of a detail of zone XXIII in FIG. 22;

FIG. 24 is a diagrammatic perspective view of another variant embodiment of the FIG. 1 connector;

FIGS. 25 and 26 are diagrammatic perspective views of another embodiment of the endpiece, shown at different angles, that is adapted to be fastened to the FIG. 24 connector;

FIG. 37 is a diagrammatic perspective view of a second variant embodiment of the FIG. 29 support; and FIG. 38 is a diagrammatic perspective view of the FIG. 37 assembled together with three end walls that are shown in FIGS. 30, 31, and 32.

Figure 4:
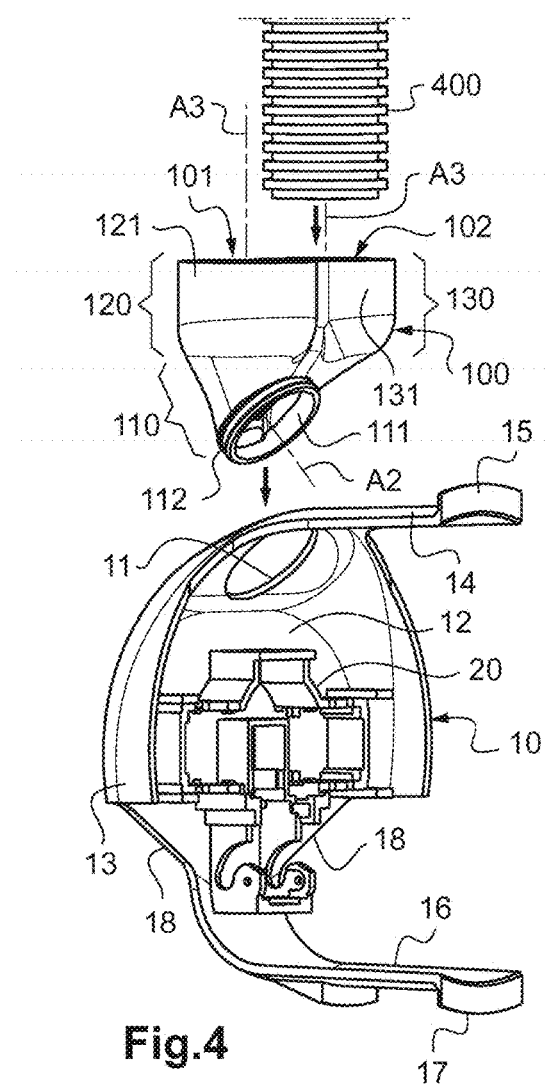
FIG. 4 is a diagrammatic perspective view of the endpiece and of the base of the FIG. 1 connector, and of a routing conduit.

Firstly, it should be observed that elements of the various variant embodiments of the invention shown in the various figures that are identical or similar are, whenever possible, referenced using the same references, and they are not described each time.

Installing an electrical accessory in a flush-mounted position in a wall requires a cavity to be formed in the wall.

It is assumed herein that the wall that receives the electrical accessory is a hollow partition. Naturally, the electrical accessory could be installed in another type of wall, such as a brick wall for example.

It should be observed that, in known manner, a hollow partition is generally made up of a metal frame (formed of vertical uprights and horizontal rails that are not shown) and plasterboards that are fitted on at least one of the two faces of the metal frame.

As shown in FIG. 1, in this embodiment, the cavity formed in the hollow partition is formed merely by a circular opening 301 that is made, using a crown saw, in one of the plasterboards 300 of the hollow partition.

In the description, the terms "front" and "rear" are thus used relative to the direction in which the electrical accessory in the circular opening 301 faces the installer. Thus, the terms "front" and "rear" designate the outwardly-facing locations of the hollow partition and the inwardly-facing locations of the hollow partition respectively.

The invention does not relate to the electrical accessory, and the electrical accessory is not shown in the figures. By way of example, the electrical accessory could be an on/off switch, a power outlet, a two-way switch, a dimmer switch, a network connector (RJ45), a telephone socket (RJ11), a computer universal serial bus (USB) socket, a digital visual interface (DVI) socket, an indicator-lamp, or a detector (for detecting smoke, flooding, temperature, movement, or light).

It should merely be observed that the rear face of the electrical accessory preferably includes means for enabling it to be connected to the local electricity network and/or to the local data network. These means are constituted by three or four flat pins that extend rearwards.

The local electricity network may be conveyed by various means, e.g. via electrical conductors made of copper.

In a variant, it could be conveyed by some other means, e.g. via a specific cable (video cable, . . . ) or via a fiber optic cable. In this variant, the cable is thus designed to be connected directly to the rear of the electrical accessory, in a terminal block of corresponding shape.

As shown in FIG. 10, the local electricity network is conveyed by three electrical conductors 401, 402, 403 (line, earth, and neutral) having free ends that project out from a routing conduit 400.

In practice, the electrical conductors are insulated electric wires 401, 402, 403, e.g. copper wires covered with plastic. The routing conduit 400 is itself of the flexible and ringed type. It comprises a tubular wall formed of a succession of rings that define grooves between them.

As shown in the figures, the routing conduit 400 is housed inside the hollow partition in such a manner that its free end can be pulled through the circular opening 301 formed in the plasterboard 300.

As shown in FIG. 14, the electrical accessory is designed to be housed in an electrical box 200 that is flush mounted in the circular opening 301.

The electrical box 200 thus makes it possible not only to fasten the electrical accessory rigidly in the wall, but also to protect it.

As shown in FIGS. 1 and 2, in this embodiment, the electrical box 200 presents a shape that is generally cylindrical, but naturally it could present some other shape, in particular a shape that is a rectangular parallelepiped.

It comprises a side wall 210 that is circularly tubular about a main axis A1, that is closed at the rear by a rear wall 220, and that is open towards the front. The electrical box 200 thus defines an internal reception housing for receiving the electrical accessory.

In order to fasten the electrical box 200 in the circular opening 301 formed in the plasterboard 300, said electrical box includes an outer collar 230 that extends externally around the edge of the front opening of the side wall 210, and that is adapted to bear against the front face of the plasterboard 300, around the circular opening 301. Thus, the outer collar 230 makes it possible to block the electrical box 200 towards the rear.

In order to block it towards the front, the electrical box 200 includes fastener means 240 that are adapted to catch on the rear of the plasterboard 300.

The fastener means could be in the form of catches that are positioned in diametrically-opposite manner on the outside face of the side wall, and that, under the control of a screw, come to catch on the rear face of the plasterboard.

In this embodiment, the fastener means 240 are formed integrally with the remainder of the electrical box 200.

They comprise rectangular flaps 241 that are cut out in the side wall 210 of the electrical box 200 in such a manner that they are attached to said electrical box solely via their front edges, thus forming a kind of hinge. On its outside face, each flap 241 carries flexible parallel ribs 242.

Each flap 241 is thus free to retract towards the inside of the electrical box 200 while the electrical box 200 is being engaged through the circular opening 301 provided in the plasterboard 300, and then to return to its initial position so that its flexible parallel ribs 242 can catch on the rear face of the plasterboard 300. The flaps 241 are then blocked in this position by the electrical accessory itself, which is shaped so that it pushes them outwards.

The electrical box 200 also includes securing means 250 for securing the electrical accessory.

The securing means could be in the form of screw-fastener wells that project from the rear wall of the electrical box, towards the front, along the inside face of the side wall, and that receive fastener screws for fastening the electrical accessory.

In this embodiment, the securing means generally comprise two diametrically-opposite cavities 250 that are set-back in the inside face of the side wall 210 of the electrical box 200, and in which snap-fastener means provided on the electrical accessory can catch.

As shown in FIG. 1, in order to make it easier to connect the electrical accessory to the insulated electric wires of the local electricity network, a connector 1 is provided.

The present invention relates more particularly to the connector 1.

As shown in FIGS. 1 and 8, in a first embodiment, the connector 1 comprises a base 10 and connection elements 31, 32, 33 that are fastened to the base 10.

The base 10 is designed to be positioned at the rear of the rear wall 220 of the electrical box 200. It thus presents a shape such that it can cover the major fraction of the rear wall 220 in such a manner as to co-operate therewith to form a double rear wall.

In this embodiment, the base 10 comprises a plane rear wall 12 that is generally circular about the main axis A1 and that is bordered at the front by a peripheral rim 13 that is adapted to come to bear against the electrical box 200 (see FIG. 2).

As shown clearly in FIG. 3, the base 10 defines an inlet opening 11 that is designed to have the insulated electric wires 401, 402, 403 pass therethrough.

As shown more particularly in FIG. 8, on the front face of the rear wall 12, three connection elements 31, 32, 33 are provided, i.e. line, neutral, and earth, for connecting the three insulated electric wires 401, 402, 403.

In a variant, a smaller number (e.g. two, line and neutral) or an increased number (e.g. four, for a two-way switch) could be provided.

Each of the connection elements 31, 32, 33 includes an inlet terminal 31A, 32A, 33A for connecting one of the insulated electric wires 401, 402, 403, and an outlet terminal 31B, 32B, 33B that is accessible via the front of the base 10 for connecting the pins of the electrical accessory.

According to a particularly advantageous characteristic of the invention, the connector 1 includes at least two distinct arms 14, 16 that extend from the base 10, mainly at the front of the front edge of the peripheral rim 13 of the base 10, and towards the front, and having free ends that present catch means 15, 17 for catching on the wall.

As shown in FIG. 13, the two arms 14, 16 thus make it possible to position the connector 1 in the plasterboard 300, before fitting the electrical box 200.

The two arms 14, 16 extend over lengths such that once caught on the plasterboard 300, they hold the base 10 to the rear of, and at a distance from, the plasterboard 300.

Thus, the two arms 14, 16 extend completely at the outside and at the front of the base 10, such that once the connector 1 is fitted in the hollow partition, the base 10 extends entirely to the rear of the plasterboard, whatever the thickness of the plasterboard that may lie in the range 6 mm to 26 mm.

As a result of the space thus left free between the base 10 and the plasterboard 300, it is easy to push the routing conduit 400 back into the hollow partition, guiding it manually in such a manner that it is positioned in the desired direction.

In the embodiment shown in FIGS. 1 to 14, the connector 1 includes only two arms 14, 16 that are situated opposite each other relative to the main axis A1.

As shown in FIG. 3, the two arms 14, 16 project in parallel directions from the front edge of the peripheral rim 13 of the base 10, extending the peripheral rim 13.

The two arms 14, 16 are straight. More precisely, in this embodiment, they present shapes that are generally rectangular, with two side edges 14A, 16A that are rectilinear, and front end edges 14B, 16B that are circular arcs. The front end edges 14B, 16B of the two arms 14, 16 lie on the same circle which is centered on the main axis A1 and which presents a diameter that is equal to the diameter of the circular opening 301 of the plasterboard 300.

The free ends of the two arms 14, 16 are curved outwards in such a manner as to form rims 15, 17 that extend radially from the front end edges 14B, 16B of the two arms 14, 16, in opposite directions. The rims 15, 17 are thus adapted to bear against the front face of the plasterboard 300, so that they form said "catch means" for catching the arms 14, 16 on the wall.

In this embodiment, the arms 14, 16 are formed integrally with the base 10 by molding a plastics material.

In a variant, provision could be made for the arms to be fitted, e.g. by snap-fastening, on the base.

In this embodiment, the inlet opening 11 that enables the insulated electric wires 401, 402, 403 to pass from the outside and the rear of the base 10 towards the inside and the front of the base 10, presents a circular shape of diameter that is sufficient to enable the three insulated electric wires 401, 402, 403 to pass simultaneously.

The inlet opening 11 is preferably situated in alignment with a first of the two arms 14. More precisely, it is situated in a flat 11A that extends over the rear wall 12 and the peripheral rim 13, and that slopes relative to the main axis A1.

As shown in FIG. 5, in this embodiment, the flat 11A slopes at 45° relative to the main axis A1, so that the angle formed between the main axis A1 and the axis A2 of the inlet opening 11 is 45°.

As shown more particularly in FIG. 3, the peripheral rim 13 advantageously presents two notches 18 that are situated on either side of the second of the two arms 16 (the arm that is situated remote from the inlet opening 11) and that are contiguous with the second arm 16. Each of the notches 18 extends over an angular sector that is greater than 20° about the main axis A1, and that is approximately equal to 50° in this embodiment.

The notches 18 are provided to make it easier to engage the connector 1 through the circular opening 301 formed in the plasterboard 300. Thus, as shown in FIGS. 10 and 13, after engaging the base 10 in the circular opening 301 via its side that carries the first arm 14 (namely the side from where the insulated electric wires 401, 402, 403 project), the notches 18 enable the base 10 to tilt in such a manner that its second arm 16 can also be engaged in the circular opening 301, avoiding the peripheral rim 13 coming into abutment against the plasterboard 300.

As shown in FIGS. 13 and 14, once the connector 1 is in place, there is a risk of the arms 14, 16 hindering the engagement of the electrical box 200 in the circular opening 301.

In order to avoid any interference between the electrical box 200 and the connector 1, as shown in FIG. 1, the side wall 210 of the electrical box 200 presents, setback in its outside face, two grooves 214, 216 having dimensions that match the dimensions of the arms 14, 16, so as to enable the arms to pass.

In FIG. 1, it should also be observed that the outer collar 230 of the electrical box 200 is interrupted in alignment with the two grooves 214, 216, so as to enable the rims 15, 17 of the connector 1 to pass.

In a variant, it could be envisaged that the electrical box does not have such a groove, and that the electrical box can take up any orientation about the main axis A1 relative to the connector.

In another variant, guide means could be provided on the inside face of the arms of the connector and on the outside face of the electrical box so as to guide the electrical box in sliding between the arms of the connector, and so as to prevent the electrical box from turning at all relative to the connector. By way of example, the means could comprise a rib having a particular profile, e.g. of dovetail shape.

In this embodiment, the connector 1 advantageously includes an endpiece 100 that is designed to guarantee that the routing conduit 400 is held relative to the base 10, and to guarantee sealing between the two elements.

As shown in FIG. 4, the endpiece 100 defines at least one passage 101, 102 for the insulated electric wires 401, 402, 403. It comprises a mounting portion 110 for mounting it on the base 10, on the axis of said inlet opening 11, and at least one securing portion 120, 130 for securing the routing conduit 400.

In practice, the endpiece 100 defines at least two distinct passages 101, 102 for insulated electric wires 401, 402, 403 that protrude from two routing conduits 400. It thus includes at least two securing portions 120, 130 for securing the two routing conduits 400.

One of the routing conduits 400 is the routing conduit described above, i.e. the routing conduit in which the insulated electric wires 401, 402, 403 coming from the local electricity network are routed. The other routing conduit is used when it is desired to connect another electrical accessory in parallel from the electrical accessory under consideration (referred to as a branch-connection). The other conduit is thus designed to protect the insulated electric wires that enable the branch-connection.

Each of the securing portions 120, 130 comprises a tubular duct 121, 131 of axis A3 and of inside diameter that is equal to the outside diameter of the routing conduits 400, ignoring assembly clearance.

The two tubular ducts 121, 131 are preferably juxtaposed in such a manner that they extend side by side, parallel to each other, and that they open out in the same direction.

As shown in FIG. 2, each tubular duct 121, 131 is provided internally with holder means 122, 132 for holding a routing conduit 400.

In this embodiment, the holder means are formed merely by ribs 122, 132 that project from the inside face of the tubular ducts 121, 131. The ribs 122, 132 extend lengthwise in planes that are perpendicular to the axes A3, and they present profiles such that they can be engaged in the grooves of the routing conduits 400 so as to guarantee that the ends of the routing conduits 400 are blocked inside the tubular ducts 121, 131.

As shown in FIGS. 4 and 5, the mounting portion 110 for mounting the endpiece 100 on the base 10 comprises a tubular duct 111 that is circularly cylindrical about an axis A2, and that externally presents a peripheral groove 112 that is engaged on the edge of the inlet opening 11 of the base 10.

In this embodiment, the endpiece 100 is made as a single piece by molding a material that is more flexible than the material of the base 10, and this makes it easier to assemble the mounting portion 110 on the edge of the inlet opening 11 of the base 10. In a variant, provision could be made for the endpiece to be made out of the same material as the base, and assembly would then entail force fitting.

Since the mounting portion 110 of the endpiece 100 and the inlet opening 11 of the base 10 present shapes that are bodies of revolution about the axis A2, it should be understood that the endpiece 100 is free to pivot relative to the base 10, about the axis A2.

This characteristic is advantageous in so far as the axes A3 of the tubular ducts 121, 131 of the securing portions 120, 130 slope relative to the axis A2 of the tubular duct 111 of the mounting portion 110. Specifically, in this embodiment, the three tubular ducts 111, 121, 131 are connected together via an intermediate portion that is flared and bent a little so that the axes A3 extend in a plane that slopes at 45° relative to the axis A2.

In this way, and as shown in FIGS. 4 and 5, by pivoting the endpiece 100 relative to the base 10, it is possible for the A3 axes to be oriented either sideways (FIG. 4) in a plane that is parallel to the plasterboard 300, or rearwards (FIG. 5). It is thus possible for the routing conduits 400 to be oriented in the desired direction, so as to make it easier to push them back into the hollow partition.

Figure 6:
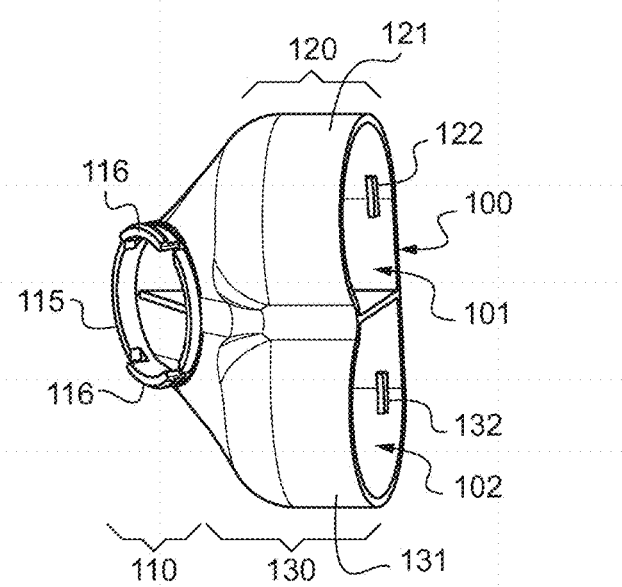
FIG. 6 is a diagrammatic perspective view of a variant embodiment of the FIG. 4 endpiece.
Figure 7:
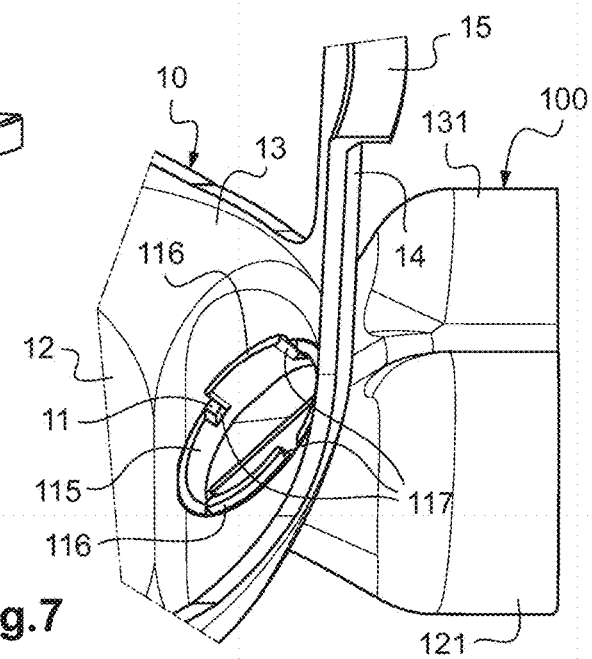
FIG. 7 is a diagrammatic perspective view of the FIG. 6 endpiece mounted on the FIG. 4 base.

FIGS. 6 and 7 show a variant embodiment of the endpiece 100. In this variant, the securing portions 120, 130 remain identical to the securing portions shown in FIGS. 4 and 5. Only the mounting portion 110 changes.

In this embodiment, the mounting portion 110 comprises a tubular duct 115 that is circularly cylindrical about the axis A2, and two snap-fastener tabs 116 that are situated in diametrically-opposite manner relative to the axis A2. The two snap-fastener tabs 116 project in parallel from the edge of the tubular duct 15. On their outside faces, they present teeth that are adapted to catch on the edge of the inlet opening 11 of the base 10.

In this variant, the endpiece 100 is made as a single piece by molding a material that is identical to the material of the base 10. Naturally, in a variant, provision could be made for the endpiece to be made out of a material that is different from the material of the base.

In this variant, as shown in FIG. 7, the tubular duct 115 presents four notches 117 that are situated in pairs on either side of each snap-fastener tab 116. The notches 117 enable the snap-fastener tabs 116 to flex more easily while the endpiece 100 is being assembled on the base 10.

As described above, the endpiece 100 could be oriented in the desired manner relative to base 10, so that its tubular ducts 121, 131 are directed either rearwards, or parallel to the plasterboard 300.

Provision could thus be made for the base 10 to include indexer means for blocking the endpiece 100 in one or the other of the two positions. Thus, provision could be made for the edge of the inlet opening 11 of the base 10 to present two lugs (not shown) that are adapted to become engaged in the notches 117 of the endpiece 100, when the endpiece is in one or the other of the two positions.

In another variant embodiment of the endpiece that is not shown in the figures, provision could be made for the mounting portion of the endpiece to present an outside face in the shape of a segment of a sphere, and for the edge of the inlet opening of the base to present a corresponding shape, so that the connection between the endpiece and the base forms a ball-and-socket connection.

Whatever its shape, the endpiece 100 makes it possible to bring the insulated electric wires 401, 402, 403 into the base 10, towards the three connection elements 31, 32, 33.

As shown in FIG. 8, the three connection elements 31, 32, 33 are fastened in reception housings 21, 22, 23 that are insulated from one another and that are defined by partitions 20 that project from the front face of the rear wall 12 of the base 10.

In practice, each reception housing 21, 22, 23 is defined by four partitions that are arranged in a rectangle. In this embodiment, two opposite partitions of each housing present facing teeth 24 for blocking the connection elements 31, 32, 33 in the base 10.

The three reception housings 21, 22, 23 are positioned relative to one another in a T-shape, with a first housing 22 that extends from the peripheral rim 13 of the base 10, at the second arm 16, to the center of the base 10. The other two housings 21, 23 extend on either side of said first housing, at right angles.

The first housing 22 is provided to receive the earth connection element 32, while the other two housings 21, 23 are provided to receive the line and neutral connection elements 31, 33.

All of the connection elements 31, 32, 33 are formed by cutting and bending a metal sheet.

Their inlet terminals 31A, 32A, 33A present shapes that are identical.

They could be automatic terminals. Thus, by way of example, each of the inlet terminals could include a spring blade that defines a duct for inserting and automatically blocking a stripped end of an insulated electrical wire.

Each of the inlet terminals could equally well be a screw terminal including a screw that is adapted to block and connect an insulated electric wire.

In this embodiment, in order to make the work of the installer easier, the inlet terminals are quick connection terminals, each fitted with an operating lever 41, 42, 43.

Each inlet terminal 31A, 32A, 33A thus comprises a rectangular and plane rear wall 311A, 321A, 331A for bearing against the rear wall 12 of the base 10, flanked by two side walls 312A, 322A, 332A that are bent at right angles towards the front, relative to the rear wall 311A, 321A, 331A.

In this embodiment, each operating lever 41, 42, 43 presents the shape of a rectangular plate that is mounted to pivot relative to the base 10 between an open position in which it uncovers the inlet terminal so as to make it possible to connect one of the insulated electric wires 401, 402, 403 thereto, and a closed position in which it closes the reception housing 21, 22, 23 of the terminal.

In this embodiment, each operating lever 41, 42, 43 is mounted to pivot on the corresponding inlet terminal 31A, 32A, 33A.

For this purpose, the side walls 312A, 322A, 332A of each inlet terminal 31A, 32A, 33A are respectively perforated on a common axis with two eyelets 313A, 323A, 333A in which pins 41A, 42A, 43A are engaged, provided on either side of each operating lever 41, 42, 43.

In order to hold them in their closed position, the operating levers 41, 42, 43 include, on their edges, teeth 41B, 42B, 43B that are adapted to snap-fasten in cavities that are provided in the partitions 20.

In order to cut the insulation of the insulated electric wire(s) 401, 402, 403 that are fitted thereto, the side walls 312A, 322A, 332A of each inlet terminal 31A, 32A, 33A present two slots 314A, 324A, 334A that extend in parallel.

Each slot 314A, 324A, 334A extends from the front edge of the corresponding side wall 312A, 322A, 332A until it reaches the proximity of the rear wall 311A, 321A, 331A, along a circular arc that is centered on the corresponding eyelet 313A, 323A, 333A.

The edges of the slots 314A, 324A, 334A are sharp so as to cut the insulation of the insulated electric wires 401, 402, 403 in order to establish an electrical connection.

As shown in FIGS. 8 and 9, on its rear face, each operating lever 41, 42, 43 presents a groove 41C, 42C, 43C that makes it possible to catch the corresponding insulated electric wire in such a manner as to force it into the slots 314A, 324A, 334A of the corresponding inlet terminal.

The outlet terminals 31B, 32B, 33B of the connection elements 31, 32, 33 are themselves shaped for receiving the flat pins of the electrical accessory. In this embodiment, they form reception sockets for receiving the pins.

In a variant, if the electrical accessory is provided at the rear with reception sockets for receiving the pins, provision could be made for the outlet terminals of the connection elements to comprise pins that project towards the front.

The connection elements 31, 32, 33 are arranged in their reception housings 21, 22, 23 in such a manner that their outlet terminals 31B, 32B, 33B are contiguous (i.e. situated in the proximity of one another, i.e. in the proximity of the center of the base 10), and that their inlet terminals 31A, 32A, 33A are situated at a distance from one another.

As shown in FIG. 11, they are also housed in their reception housings 21, 22, 23 in such a manner that the pivot axes A41, A42, A43 of the operating levers 41, 42, 43 are all parallel to the rear wall 12 of the base 10.

More precisely, the pivot axis A42 of the operating lever 42 of the earth connection element 32 is oriented orthogonally relative to the axis A2 of the inlet opening 11 of the base, and the pivot axes A41, A43 of the other two operating levers 41, 43 are oriented perpendicularly to the first pivot axis A42.

In other words, in orthogonal projection onto the plane of the front face of the rear wall 12 of the base 10, the two pivot axes A41, A43 and the axis A2 of the inlet opening 11 are parallel.

In this way, and as shown in FIGS. 12 and 13, in order to engage the insulated electric wires 403, 401 in the inlet terminals 31A, 33A of the line and neutral connection elements 31, 33, it is not necessary to bend them significantly. Naturally, in a variant, the operating levers could be arranged in some other way in the base.

As shown in FIGS. 8 and 11, the connector 1 also includes a cap 50 for snap-fastening over the partitions 20 of the base 10, at the center of said base, so as to hide the outlet terminals 31B, 32B, 33B of the connection elements 31, 32, 33.

The cap 50 presents the shape of a square plate. It includes a central opening 52 for accessing the outlet terminal 32B of the earth connection element 32, and two circularly-arcuate openings 51, 53 that are centered on the central opening 52 and that give access to the outlet terminals 31B, 33B of the other connection elements 31, 33.

As shown in FIG. 14, the rear wall 220 of the electrical box 200 also presents at least one access opening 221 for enabling the electrical accessory to be connected to the connector 1.

In this embodiment, it presents a single access opening 221 that is circular and centered on the main axis A1. The access opening 221 presents a diameter that is greater than the diameter of the circularly-arcuate openings 51, 53 in the cap 50, so as to make it possible to access all three outlet terminals 31B, 32B, 33B of the connection elements 31, 32, 33 of the connector 1 simultaneously.

The access opening 221 is initially closed by a diaphragm 222 that is detachable or that can be knocked out. In this embodiment, it is closed by a detachable diaphragm 222 that is overmolded on the body of the electrical box 200 and that, on its front face, presents a tab 223 that makes it easier to pull it off.

As a result of the detachable diaphragm 222, when the electrical box 200 is put into place in the plasterboard 300, it is possible to paint the plasterboard while avoiding the paint covering the outlet terminals 31B, 32B, 33B of the connection elements 31, 32, 33 of the connector 1.

With reference to FIGS. 10 to 14, there follows a detailed description of how the electrical accessory is put into place in the hollow partition and is connected.

Initially, a circular opening 301 is formed, using a hole saw, in the plasterboard 300 of the hollow partition, so that the free end of a routing conduit 400 can be pulled to the outside of the hollow partition, through the circular opening 301.

As shown in FIG. 10, the ends of the insulated electric wires 401, 402, 403 that protrude from the routing conduit 400 are then engaged through the endpiece 100 and through the inlet opening 11 of the base 10, then the end of the routing conduit 400 is blocked in one of the tubular ducts 121 of the endpiece 100.

After lifting up the operating lever 41 that is mounted on the line connection element 31, the installer bends the insulated electric line wire 401 so as to be able to place the end of the wire above the mouth of the slots of the inlet terminal of the connection element 31. The installer then lowers the operating lever 41 down into its closed position, thereby causing the insulated electric neutral wire 401 to become engaged in the slots of the inlet terminal. The insulation of the wire is thus cut automatically, thereby making it possible to establish electrical contact between the wire and the outlet terminal of the connection element 31.

As shown in FIGS. 11 and 12, the installer then bends the insulated electric earth wire 402 in such a manner that it goes round the reception housing 23 of the line connection element 33, and passes between said line connection element and the peripheral rim 13 of the base 10. In order to make it easier to put the wire into place, the installer puts the operating lever 43 of the line connection element 33 in its open position.

The installer then proceeds in the same way as described above in order to connect the insulated electric earth wire 402 to the inlet terminal of the earth connection element 32.

The installer also proceeds in the same way as described above in order to connect the insulated electric line wire 403 to the inlet terminal of the line connection element 33 (see FIG. 12).

When the installer closes the operating lever 43 of the line connection element 33, the operating lever 43 naturally becomes positioned above the insulated electric earth wire 402, thereby making it possible to hold said insulated electric earth wire in position. For this purpose, the operating lever 43 is designed to project beyond the reception housing 23 of the line connection element 33.

It should be observed that in order to connect the insulated electric wires 401, 402, 403, the installer should not have to cut them to the desired length since, if the wires are particularly long, their ends may be pulled through the notches 18 of the base 10. The wires are cut to the proper length after being connected, which makes the work of the installer easier.

It should also be observed that when the installer wishes to connect another electrical accessory in parallel with the electrical accessory under consideration, a second routing conduit can be engaged in the endpiece 100, then the three wires protruding from the second routing conduit can be connected in the slots of the inlet terminals 31A, 32A, 33A of the connection elements 31, 32, 33, over the above-mentioned insulated electric wires 401, 402, 403.

As shown in FIG. 13, the connector 1 is then put into place through the circular opening 301 formed in the plasterboard 300, initially by engaging it via its side from which the routing conduit(s) 400 emerge(s), then by tilting it without difficulty as a result of the notches 18 formed in the base 10.

The connector 1 is that much easier to put into place in the hollow partition, given that, as a result of the small thickness of the base 10, the installer still has access to the routing conduit(s) 400 while the connector 1 is being installed in the wall, so that they can be pushed back into the wall in the desired direction and more easily.

The installer may also orientate the endpiece 100 relative to the base 10 in the desired manner before installing the connector 1 in the wall, which also makes it easier to push the routing conduit(s) 400 back into the wall.

The connector 1 is considered to be in place when the rims 15, 17 of the arms 14, 16 bear against the front face of the plasterboard 300.

As shown in FIG. 14, all that then remains for the installer to do is engage the electrical box 200 through the circular opening 301 formed in the plasterboard 300, which is performed without difficulty as a result of the grooves 214, 216 that are provided on the outside face of the side wall 210 of the electrical box 200.

The electrical box is considered to be in place when its rear wall bears against the base 10, and when the access opening that is provided in its rear wall is positioned facing the outlet terminals of the connection elements of the connector 1.

The present invention is not limited to the embodiment described and shown, and the person skilled in the art can apply any variation thereto in accordance with the spirit of the invention.

In particular, as shown in FIGS. 15 and 16, it is possible to envisage using a connector 501 of different shape when the electrical box to be engaged in the wall is a multi-station box, i.e. a box adapted to receive two or more electrical accessories.

FIGS. 15 and 16 show a connector 501 that is designed to be used in combination with an electrical box having two stations (not shown).

The connector 501 thus presents a base 510 that defines two distinct stations 510A, 510B. Each station presents a structure that is practically identical to the structure of the connector 1 shown in FIGS. 1 to 14. The only slight difference is the shape of the rear walls 512A, 512B and of the peripheral rims 513A, 513B of the two stations 510A, 510B, since the rear walls and the peripheral rims meet at a rectilinear partition 520.

In particular, each station 510A, 510B thus presents one inlet opening 511A, 511B, three connection elements (not shown), and three operating levers 541A, 542A, 543A, 541B, 542B, 543B.

In the connector 501, at least three distinct arms 514, 516 are provided so as to guarantee better fastening of the connector 501 to the wall.

Specifically, in this embodiment, four arms are provided that are distributed in pairs at each station 510A, 510B.

FIG. 17 shows another variant embodiment of the connector 1.

In this variant, the base 10 and the connection elements housed in the base 10 have shapes that are similar to the shapes of the base 10 and of the connection elements of the connector 1 shown in FIG. 1. The operating levers 41, 42, 43 present shapes that are slightly different, being more tapered, but that does not affect their operation.

In this variant, initially it should be observed that the peripheral rim 13 of the base 10 is not interrupted along the notches 18, and that it also borders the rear wall along the notches 18.

It should also be observed that the cap 50 presents a shape that is slightly different from the shape shown in FIG. 8. This variant embodiment of the cap 50 is described in detail in the description below, with reference to FIGS. 20 to 23.

As shown clearly in FIG. 17, the endpiece 100 presents a shape that is substantially different to the shape of the endpiece shown in FIG. 1. In addition, it is molded as a single piece out of material that is more flexible than the body of the electrical box, namely styrene-ethylene-butylene-styrene (SEBS) in this embodiment.

As shown in FIGS. 18 and 19, in this variant, the endpiece 100 still includes a mounting portion 110 for mounting it on the base 10, and two securing portions 120, 130 for securing two routing conduits 400.

The mounting portion 110 includes a tubular duct 113 of oblong section that externally presents a peripheral groove 114 that is engaged on the edge of the inlet opening of the base 10. In this variant, the inlet opening also presents an oblong shape, so that the mounting of the mounting portion 110 on the base 10 guarantees that the two elements are fastened together in rigid manner.

In this embodiment, the two securing portions 120, 130 are identical. Each of them defines a passage for the electric wires.

At their junction with the mounting portion 110, each of them presents a connection piece 126, 136 of shape that is generally conical, flaring towards the outside.

The walls of the connection pieces 126, 136 are of small thickness so that the connection pieces 126, 136 form kinds of hinges that enable the securing portions 120, 130 to pivot relative to the mounting base 110.

In this embodiment, the two securing portions 120, 130 comprise a succession of tubes 125, 135 of various diameters that are circularly cylindrical.

Thus, in this embodiment, the securing portions 120, 130 may receive three kinds of routing conduit having different diameters.

Each tube 125, 135 is provided with its own fastener means 138 (see FIG. 19) for fastening a routing conduit. In this embodiment, the fastener means are in the form of two diametrically opposite teeth 138 that project inside each tube 125, 135 and that are adapted to be engaged in one of the grooves of the corresponding routing conduit.

FIG. 20 shows, in detail, the cap 50 of the FIG. 17 connector.

FIGS. 21 to 23 show a variant embodiment of the FIG. 1 electrical box, that is specifically designed to co-operate with the FIG. 17 connector.

As shown in FIG. 20, the cap 50 for snap-fastening over the partitions 20 of the base 10 of the FIG. 17 connector (in order to insulate the connection elements) presents a front wall 54 of shape that is square, with rounded corners.

At its four rounded corners, the front wall 54 is bordered by rims 55 that extend in parallel behind the front wall 54.

In addition, at its four straight edges, the front wall 54 is flanked by four snap-fastener tabs that are adapted to catch on the base 10 of the FIG. 17 connector.

In this embodiment, the front wall 54 likewise presents three access openings 51, 52, 53 for accessing the outlet terminals of the connection elements.

As shown in FIG. 21, the rear wall 220 of the electrical box 200 presents at least one access opening 221 for enabling the electrical accessory to be connected to the connector 1.

In this embodiment, it presents a single access opening 221 having an edge that presents a shape that is identical to the shape of the front wall of the cap 50, ignoring assembly clearance. In this way, when the electrical box 200 is fitted on the connector 1, the front wall 54 of the cap 50 closes the access opening 221.

In the same way as for the FIG. 1 electrical box, the access opening 221 is initially closed by a detachable diaphragm 222 that, on its front face, presents a tab 223 that makes it easier to pull it off.

The diaphragm 222 is overmolded on the body of the electrical box 200 out of a material that is more flexible than the material of the body of the electrical box, specifically SEBS in this embodiment.

In practice, the diaphragm 222 is overmolded on the body of the electrical box 200 at the same time as the flexible parallel ribs 242 that cover the flaps 241 of the electrical box 200 (see FIG. 21).

As shown more particularly in FIGS. 22 and 23 (in which a central portion of the diaphragm 222 has been pulled off to free the access opening 221), the diaphragm 222 presents, over its peripheral portion and along the edge of the access opening 221, a bulge 224 that covers the edge.

In addition, along the edge of the bulge 224, the peripheral portion of the diaphragm 222 presents a line of weakness that makes it easier to pull the central portion of the diaphragm 222 off along the line.

In FIGS. 22 and 23, it should thus be observed that when the central portion of the diaphragm 222 has been pulled off, only the bulge 224 remains.

The bulge 224 thus performs the function of a sealing lip, since it becomes positioned between the edge of the access opening 221 of the electrical box 200 and the edge of the front wall 54 of the cap 50.

FIG. 24 shows a variant embodiment of the connector 1.

In this variant, the connector 1 presents a shape that is almost identical to the shape of the FIG. 17 connector 1. It differs therefrom only by the shape of its inlet opening 60.

In this embodiment, the inlet opening 60 presents a rectangular shape that is elongate along a portion of the periphery of the peripheral rim 13 of the base 10. It presents a first edge that is situated at the rear wall 12 of the base 10. On the outside of the connector 1, its other three edges are bordered by a rim 61.

A groove 62 is setback in the inside face of the rim 61.

FIGS. 25 to 28 show another embodiment of the endpiece 100, adapted to be fastened to the connector 1, on the axis of the inlet opening 60.

In this embodiment, the endpiece 100 presents three distinct securing portions that are in the form of three ducts 120, 130, 140 for receiving the free ends of three different routing conduits.

Figure 27:
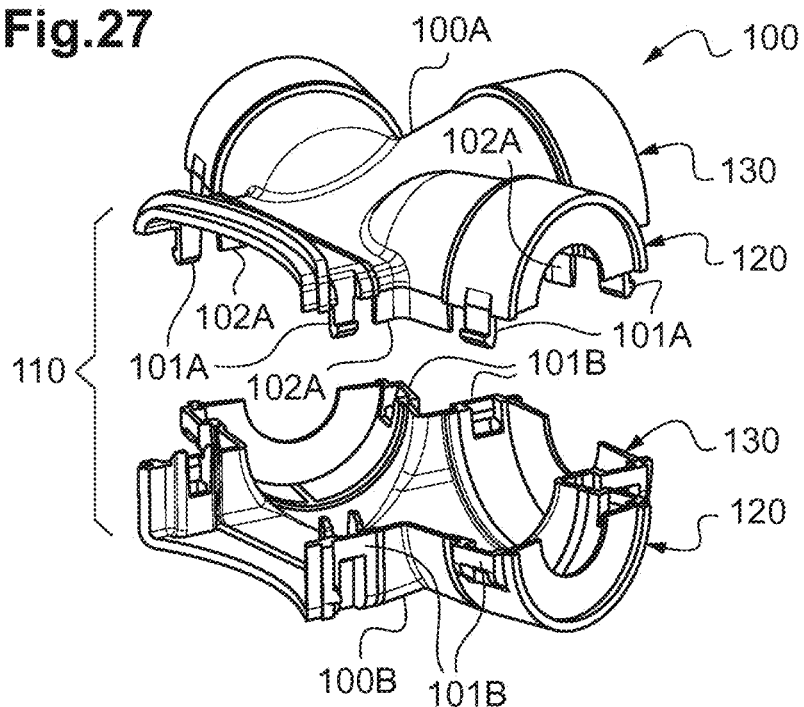
FIGS. 27 and 28 are exploded diagrammatic perspective views of the endpiece in FIGS. 25 and 26.
Figure 28:
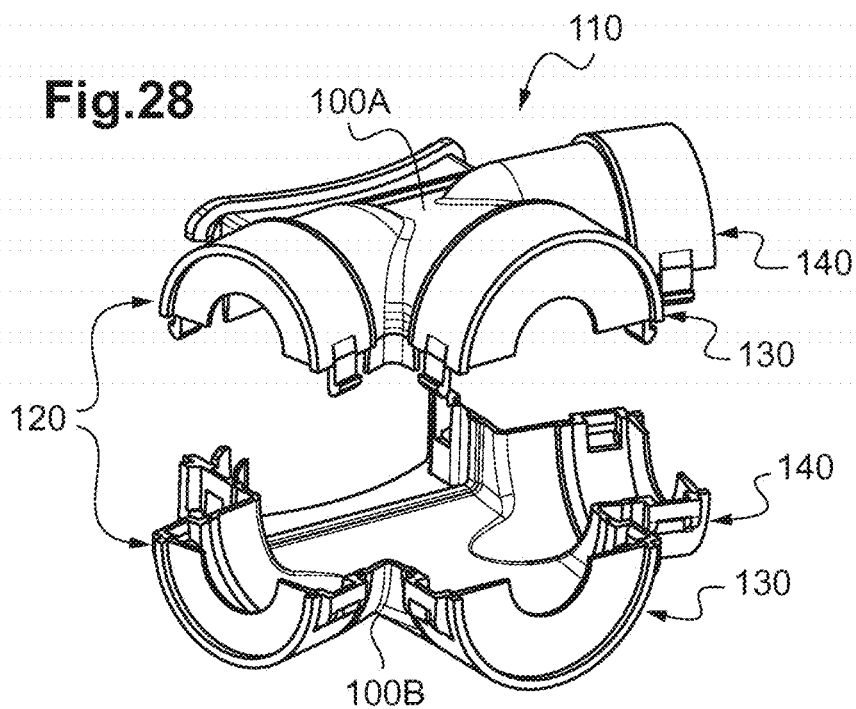

As shown in FIGS. 27 and 28, the endpiece 100 is formed of two half-shells 100A, 100B that are almost identical and that are provided with snap-fastener means so as to enable them to be assembled together.

As shown in FIGS. 25 and 26, the endpiece 100 presents a flexible portion, which is made out of SEBS in this embodiment, on which rigid portions are overmolded, being made out of polypropylene in this embodiment.

Thus, at its free end, the mounting portion 110 of the endpiece 100 includes a rigid sleeve 111B of rectangular section that is extended towards the ducts 120, 130, 140 by a flexible sleeve 111A.

In the same way, each duct 120, 130, 140 includes a rigid collar 120B, 130B, 140B of annular shape that is extended towards the mounting portion 110 by a flexible tube 120A, 130A, 140A.

In this embodiment, the ducts 120, 130, 140 co-operate with the mounting portion 110 to form a cross. Thus, one of the ducts 130 extends on the axis of the mounting portion 110, while the other two ducts 120, 140 extend almost at right angles relative thereto. More precisely, in this embodiment, the two ducts 120, 140 slope a little towards the first duct 130, at about 80° relative to said first duct.

All of the flexible tubes 120A, 130A, 140A of the ducts 120, 130, 140 thus communicate with the flexible sleeve 111A of the mounting portion 110.

As shown in FIG. 25, over three sides of its outside face, the rigid sleeve 111B of the mounting portion 110 is bordered by a rib 112A that is adapted to slide into the groove 62 setback in the rim 61 of the inlet opening 60 of the connector 1.

As a result, it is possible to fit the endpiece 100 via the rear of the connector 1, by sliding its rib 112A in the groove 62.

In order to block the endpiece 100 in position on the connector 1 when its mounting portion 110 is situated on the axis of the inlet opening 60 of the connector 1, the rib 112A carries two snap-fastener teeth 113A that are adapted to be clipped in two notches 63 that are setback in the inside face of the rim 61 of the inlet opening 60 of the connector 1 (see FIG. 24).

As shown in FIGS. 25 and 26, in this embodiment the duct 130 that is situated on the axis of the mounting portion 110 presents a diameter that is greater than the diameter of the other two ducts 120, 140, such that it can receive routing conduits of greater diameter.

In order to provide sealing at the junction between the routing conduit and the duct in which it is inserted, the collar 120B, 130B 140B of each duct 120, 130, 140 is closed in part by a flexible annular membrane 120C, 130C, 140C.

In this embodiment, each flexible annular membrane 120C, 130C, 140C forms a plane washer that internally borders the free end of the corresponding duct 120, 130, 140, and that is designed so as to deform when a routing conduit is threaded inside the corresponding duct 120, 130, 140.

As shown in FIGS. 27 and 28, one of the half-shells 100A carries snap-fastener tabs 101A that are adapted to snap-fasten on the other half-shell 100B.

More precisely, in this embodiment, a snap-fastener tab 101A is provided on either side of each half-collar 120B, 130B, 140B, and on either side of the rigid half-sleeve 111B of the first half-shell 100A. Cradles 101B are provided in correspondence on the other half-shell 100B, so that the snap-fastener tabs 101A can pass therein and be clipped therein.

In this embodiment, since the ducts 120, 130, 140 are rigid in part, they present stiffness that is sufficient to ensure that the routing conduits are fastened properly to the endpiece 100.

Since they are flexible in part, they enable the endpiece 100 to deform so as to make it easier to connect the routing conduits.

It should be understood that when the endpiece 100 deforms, the edges of the flexible portions of the two half-shells 100A, 100B risk moving away from each other, creating gaps.

This is why, as shown clearly in FIG. 27, the edge of the flexible portion of the first half-shell 100A is extended by tabs 102A that are provided to bear against the inside face of the flexible portion of the other half-shell 100B. Thus, when the installer deforms the endpiece 100, the tabs 102A close the gaps that are created between the edges of the flexible portions of the two half-shells 100A, 100B.

It should be understood that in the various embodiments shown in FIGS. 1 to 17, it is necessary to provide two different kinds of connector 1, one with three connection elements and the other with four connection elements, depending on whether the rear of the electrical accessory to be connected thereto includes three or four flat pins.

The number of kinds of connector to be provided is even greater when it is also desired to propose single-station connectors (FIG. 1) and multi-station connectors (see FIGS. 15 and 16), since it is thus necessary to provide a single-station connector having four connection elements, a single-station connector having three connection elements, and double-station connector having four connection elements, a double-station connector having three connection elements, and a hybrid double-station connector (with a station having four connection elements and a station having three connection elements).

It should be understood that when new kinds of connector are added, e.g. when it is desired to offer connectors having one or two or no connection element, then the number of kinds of connector to be provided is very large, to the detriment of the costs of manufacturing and storing the connectors.

Finally, it should be understood that it is also necessary to double the number of kinds of multi-station connector, so as to make connectors available that can be mounted vertically in the wall (in such a manner that the stations are situated one above the other), and connectors that can be mounted horizontally in the wall (in such a manner that the stations are situated one beside the other).

Specifically, since the three inlet terminals are not orientable relative to the base, they require the electrical accessories to be oriented relative to the base. They thus require the electrical accessories to be oriented relative to the wall. However, and by way of example, a switch should always be positioned on the wall in such a manner that its control button rocks about a horizontal axis.

It is thus necessary to provide a multi-station connector of a kind for mounting vertically in the wall so that they can receive electrical accessories in the desired position relative to the wall, and another multi-station connector of a kind for mounting horizontally in the wall so that they can receive electrical accessories in the desired position relative to the wall.

In the second embodiment shown in FIGS. 29 to 34 and in the two variants shown in FIGS. 35&36 and 37&38 respectively, the connector 600; 700; 800 forms a modular system that is made up of a support 610; 710; 810 (that carries the arms), and at least one removable cartridge 640, 650, 660, 670, 680 (that may be provided with zero, three, or four connection element(s)).

The cartridges are fastened to the support in the factory or by the user, once the user has defined the exact needs in terms of connection elements.

It can thus be understood that, in order to satisfy all needs, it is necessary only to provide a single-station support, a double-station support, and a triple-station support, together with a cartridge having zero connection elements, a cartridge having three connection elements, and a cartridge having four connection elements.

The supports and the cartridges are described more fully in the description below.

Figure 29:
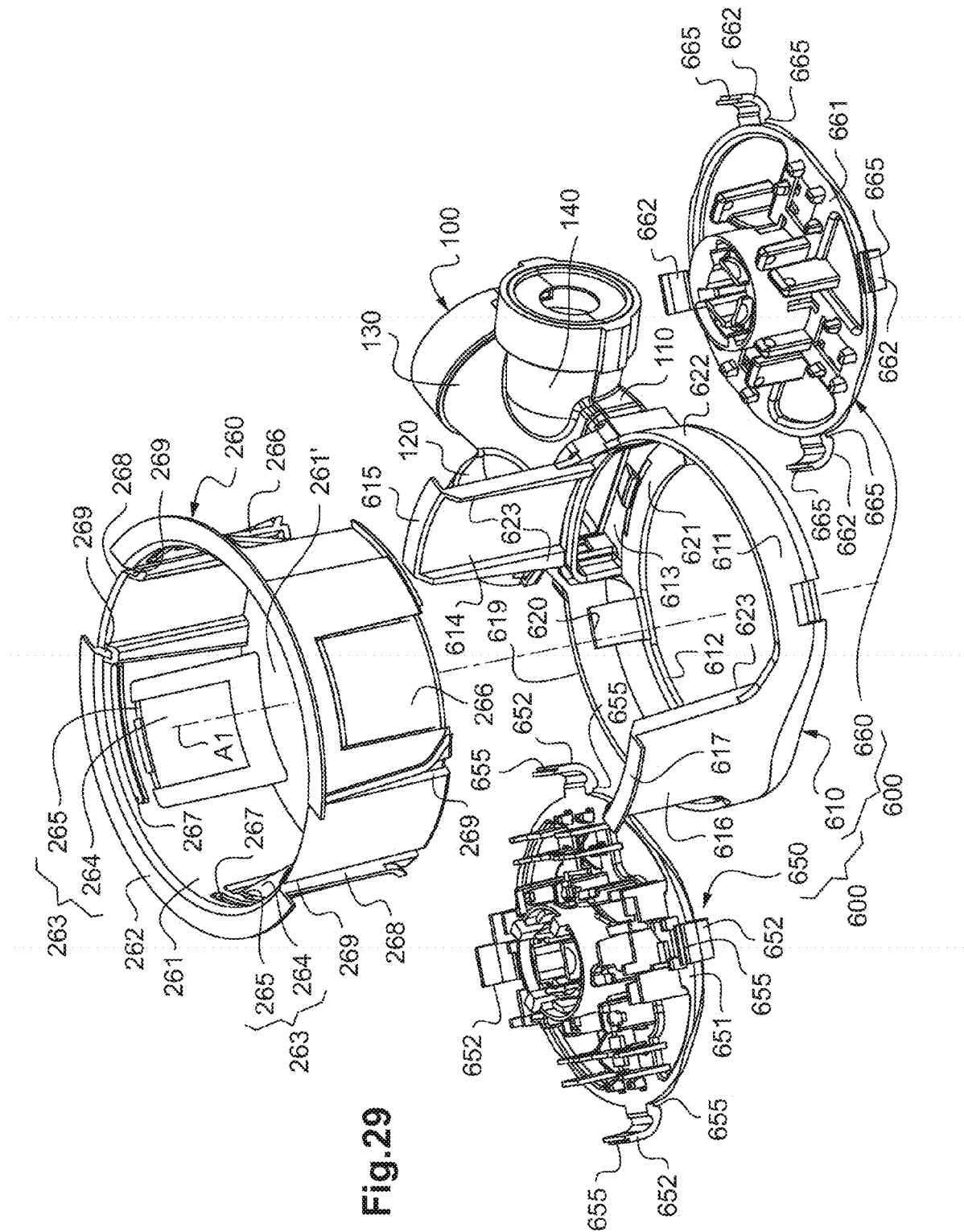
FIG. 29 is an exploded diagrammatic perspective view of a connector in a second embodiment of the invention, shown with a support and two end walls, and of an electrical box for fitting in a wall.

Before that, the electrical box 260 shown in FIG. 29 is described briefly, which electrical box is designed to be flush-mounted through the circular opening formed in the hollow partition, for receiving an electrical accessory internally and for receiving the connector 600 via the rear.

The electrical box 260 thus makes it possible not only to fasten the electrical accessory rigidly in the hollow partition, but also to protect it.

As shown in FIG. 29, in this embodiment, the electrical box 260 presents a shape that is generally cylindrical, but naturally it could present some other shape, in particular a shape that is a rectangular parallelepiped.

It comprises a side wall 261 that is circularly tubular about a main axis A1, and that is open towards the front. The electrical box 260 thus defines an internal reception housing for receiving the electrical accessory.

It could be envisaged that the side wall 261 is closed at the rear by a rear wall 261'. However, in a variant, it could be left open at the rear.

In order to fasten the electrical box 260 in the circular opening formed in the plasterboard of the hollow partition, said electrical box includes an outer collar 262 that extends externally around the edge of the front opening of the side wall 261, and that is adapted to bear against the front face of the plasterboard, around the circular opening. Thus, the outer collar 262 makes it possible to block the electrical box 260 towards the rear.

In order to block it towards the front, the electrical box 260 includes fastener means 263 that are adapted to catch on the rear of the plasterboard.

The fastener means could be in the form of catches that are positioned in diametrically-opposite manner on the outside face of the side wall, and that, under the control of a screw, come to catch on the rear face of the plasterboard.

In this embodiment, the fastener means 263 are formed integrally with the remainder of the electrical box 260.

They comprise rectangular flaps 264 that are cut out in the side wall 261 of the electrical box 260 in such a manner that they are attached to said electrical box solely via their front edges, thus forming a kind of hinge 265. On its outside face, each flap 264 carries a layer of compressible material 266 that is elastically deformable.

Each flap 264 is held inside the electrical box 260, which makes it possible to engage the electrical box 260 through the circular opening provided in the plasterboard. The flaps 264 are then designed to be pushed outwards and blocked in that position by the electrical accessory when it is engaged in the electrical box. The layer of compressible material 266 is thus adapted to compress against and catch on the rear face of the plasterboard.

The electrical box 260 also includes securing means 267 for securing the electrical accessory.

The securing means could be in the form of screw-fastener wells that project from the rear wall of the electrical box, towards the front, along the inside face of the side wall, and that receive fastener screws for fastening the electrical accessory.

In this embodiment, the securing means generally comprise two diametrically-opposite cavities 267 that are set-back in the inside face of the side wall 261 of the electrical box 260, and in which snap-fastener means provided on the electrical accessory can catch.

FIG. 29 also shows a support 610 and two cartridges 650, 660 each of which can be assembled on the support 610 so as to form a connector 600.

The support 610 comprises a peripheral wall 611 that defines a main opening 612 for receiving one of the cartridges 650, 660, and a side inlet opening 613 for receiving electric wires.

The peripheral wall 611 includes catch means 620 for catching one of the cartridges 650, 660 in its main opening 612.

In addition, it defines a front edge 619.

The support 610 also comprises two distinct arms 614, 616 that extend from the peripheral wall 611, mainly at the front of its front edge 619, and having free ends that present catch means 615, 617 for catching on the wall.

FIGS. 30 to 34 show five cartridges 640, 650, 660, 670, 680 which can be fastened in the main opening 612 of the support 610.

As shown in FIGS. 30 to 34, each cartridge 640, 650, 660, 670, 680 comprises a rear wall 641, 651, 661, 671, 681, and catch means 642, 652, 662, 672, 682 for catching the rear wall 641, 651, 661, 671, 681 on the support 610.

In particular, the fastener means are designed to enable the rear wall 641, 651, 661, 671, 681 to be mounted on the support 610 in at least two different angular positions that are spaced apart from each other by 90° (which position is selected depending on whether it is desired to fasten the connector in the wall with the two arms one above the other, or with the two arms one beside the other). As a result, the electrical accessory fitted in the electrical box 260 can be installed in the desired angular position (by way of example, a switch can be installed so that its control button rocks about a horizontal axis).

Figure 30:
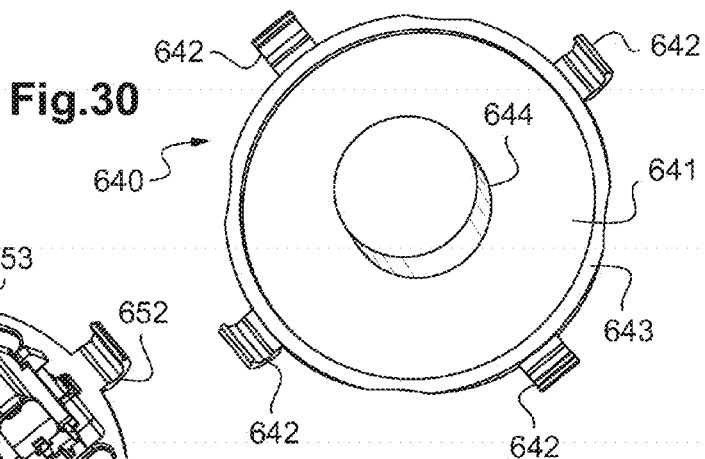
FIGS. 30 to 34 are diagrammatic perspective views of five end walls of various shape that are suitable for being used in the support of the FIG. 29 connector.

The cartridge 640 shown in FIG. 30 does not have a connection element. It is used when the box forms a mere branch-connection box or when the electrical box 260 is designed to receive an electrical accessory having a DVI socket function.

In contrast, the cartridges 650, 660, 670, 680 shown in FIGS. 31 to 34 include at least one connection element that is fastened to the rear wall 641, 651, 661, 671, 681 and that includes an inlet terminal for connecting an electric wire, and an outlet terminal that is accessible via the front of the rear wall for connecting at least one electrical accessory.

In the embodiment shown in FIG. 29, the base of the connector 600 is thus formed of two portions that are suitable for being assembled together, namely the support 610 and the rear wall 651, 661 of the selected cartridge 650, 660.

Preferably, in this embodiment, the catch means 620, 642, 652, 662, 672, 682 for catching the rear wall 641, 651, 661, 671, 681 on the support 610 are unlockable snap-fastener means, so that the user can assemble the cartridge on the support without a tool, and so that the user can also separate the two elements if necessary (this time, preferably by using a tool).

The connector 600 is designed to be positioned at the rear of the electrical box 260. It thus presents a shape such that it can co-operate with the rear wall of the box to form a double rear wall.

For this purpose, the rear wall is plane and generally circular about the main axis A1.

It may be closed entirely (as in FIG. 30), or open in part (as in FIGS. 31 to 34).

The rear wall 641 of the cartridge may possibly be bordered at the front by a peripheral stiffening rim 643 of small size (see FIG. 30).

As shown clearly in FIG. 29, in order to receive the cartridge, the peripheral wall 611 of the support 610 presents an annular plane portion 621 that defines the main opening 612 for receiving the cartridge.

The annular plane portion 621 is bordered at the front by a peripheral rim 622 that is adapted to bear against the rear end of the side wall 261 of the electrical box 260.

In this embodiment, the rear wall 641, 651, 661, 671, 681 of each cartridge is designed to be held against the annular plane portion 621 of the support 610 solely by means of the above-mentioned unlockable snap-fastener means.

In this embodiment, the snap-fastener means 642, 652, 662, 672, 682 comprise four tabs that are regularly distributed around the main axis A1, that extend outwards from the peripheral edge of the rear wall 641, 651, 661, 671, 681 of the cartridge, and that have free ends that curve towards the front.

As shown clearly in FIG. 29, at its front free end and at its rear end, each tab 652, 662 presents a setback notch 655, 665.

The complementary snap-fastener means provided on the support 610 comprise four cavities 620 that are setback in the inside face of the peripheral rim 622.

At the front and at the rear, the cavities 620 present edges on which the notches 655, 665 of the tabs 652, 662 of each cartridge can catch.

The cavities 620 present widths that are identical to the widths of the tabs 642, 652, 662, 672, 682 of each cartridge, ignoring assembly clearance, so that their side edges form abutments that prevent the cartridge that is snap-fastened in the support 610 from pivoting relative to said support.

It should thus be understood that the snap-fastener means that are used make it possible to block any movement of the cartridge relative to the support 610.

The two arms 614, 616 of the support 610 are designed to enable the connector to be positioned in the plasterboard, before fitting the electrical box 260 in the circular opening formed in the plasterboard.

The two arms 614, 616 extend over lengths such that once caught on the plasterboard, they hold the peripheral wall 611 of the support 610 to the rear of, and at a distance from, the plasterboard, whatever the thickness of the plasterboard that may lie in the range 6 mm to 26 mm.

In this embodiment, the two arms 614, 616 extend entirely at the front of the peripheral wall 611, from the front edge 619 of the peripheral wall 611.

As a result of the space thus left free between the front edge 619 of the wall 611 of the support 610 and the plasterboard 300, it is easy to push the routing conduit(s) back into the hollow partition, guiding each manually in such a manner that it is positioned in the desired direction.

In this embodiment, the two arms 614, 616 are situated opposite each other relative to the main axis A1. They project in parallel directions from the front edge 619, extending the peripheral wall 611.

The two arms 614, 616 are straight. More precisely, in this embodiment, they present shapes that are generally rectangular, with two side edges that are rectilinear, and front end edges that are circular arcs.

The side edges of the two arms 614, 616 are bent at right angles towards the inside of the connector so as to form two ribs 623, for a reason that is described in detail below.

The front end edges of the two arms 614, 616 lie on the same circle, which is centered on the main axis A1 and which presents a diameter that is equal to the diameter of the circular opening formed in the plasterboard.

The front ends of the two arms 614, 616 are curved outwards in such a manner as to form rims 615, 617 that extend radially from the front end edges of the two arms 614, 616, in opposite directions. The rims 615, 617 are thus adapted to bear against the front face of the plasterboard, so that they form said "catch means" for catching the arms 614, 616 on the wall.

In this embodiment, the arms 614, 616 are formed integrally with the support 610 by molding a plastics material.

As shown in FIG. 29, once the connector 600 is in place in the plasterboard, there is a risk of its arms 614, 616 hindering the engagement of the electrical box 260 in the same plasterboard.

In order to avoid any interference between the electrical box 260 and the connector 600, the side wall 261 of the electrical box 260 presents, setback in its outside face, two recesses 268 having dimensions that match the dimensions of the arms 614, 616 of the connector 600, so as to enable the arms to pass.

The edges of the two recesses 268 are grooved by rails 269 of axes that are parallel to the main axis A1. The rails 269 are dimensioned to receive the ribs 623 provided on the edges of the arms 614, 616. In this way, they make it possible to guide the electrical box 260 in sliding between the two arms 614, 616. The rails 269 flare rearwards so as to make them easier to engage on the ribs 623 of the arms 614, 616.

The ribs 623 present shapes that are the exact opposite of the shapes of the rails 269, so that once the electrical box 260 is fitted on the support 610, the rails 269 prevent the electrical box 260 from pivoting at all relative to the support 610.

The ribs 623 and the rails 269 thus make it possible to fit the electrical box 260 more securely to the support 610. They further provide a keying function in so far as they prevent the installer from mounting the electrical box 260 in the support 610 in an angular position other than the prescribed angular position.

In FIG. 29, it should also be observed that the outer collar 262 of the electrical box 260 is interrupted in alignment with the two recesses 268, so as to enable the rims 615, 617 to pass.

In this embodiment, the support 610 defines a single inlet opening 613 that is designed to pass the insulated electric wires therethrough. In this embodiment, it includes securing means for securing an endpiece 100 for connecting one, two, or three cable routing conduits.

In this embodiment, the inlet opening 613 that enables the insulated electric wires to pass from the outside of the support 610 towards the inside and the front of the support 610, presents a rectangular shape of section that is sufficient to enable at least six insulated electric wires to pass simultaneously.

The inlet opening 613 is preferably situated in alignment with a first of the two arms 614, extending over the annular plane portion 621 and the peripheral rim 622 of the support 610.

In a variant, it could extend as far as the main opening 612 of the support 610, so that it forms a "notch" in the edge of the main opening 612.

As can be seen in FIG. 29, the connector 600 includes an endpiece 100 that is designed to guarantee that the cable routing conduit(s) is/are held relative to the support 610, and to guarantee sealing between the two elements.

In this embodiment, the endpiece 100 presents a mounting portion for mounting on the support 610, and three routing conduit securing portions that are in the form of three ducts 120, 130, 140 for receiving the free ends of three different routing conduits.

The endpiece 100 presents a flexible portion, made out of SEBS in this embodiment, on which rigid portions are overmolded, made out of polypropylene in this embodiment.

Thus, the mounting portion 110 of the endpiece 100 that presents the shape of a tube of rectangular section, comprises a flexible portion that is extended, beside its free end, by a rigid sleeve. The rigid sleeve is thus fitted with slide means for sliding onto the support 610, on the axis of the inlet opening 613, and with snap-fastener means for snap-fastening on the support 610.

In the same way, each duct 120, 130, 140 includes a flexible portion that is extended, beside its free end, by a rigid collar of annular shape.

In this embodiment, the ducts 120, 130, 140 co-operate with the mounting portion 110 to form a cross. Thus, one of the ducts 130 extends on the axis of the mounting portion 110, while the other two ducts 120, 140 extend almost at right angles relative thereto.

In this embodiment the duct 130 that is situated on the axis of the mounting portion 110 presents a diameter that is greater than the diameter of the other two ducts 120, 140, such that it can receive routing conduits of greater diameter.

In order to ensure good mechanical behavior of the routing conduit in the duct in which it is inserted, the collar of each duct 120, 130, 140 is closed in part by a flexible annular membrane. In this embodiment, each flexible annular membrane forms a plane washer that internally borders the free end of the corresponding duct 120, 130, 140, and that is designed so as to deform when a routing conduit is threaded inside the corresponding duct 120, 130, 140.

In this embodiment, since the ducts 120, 130, 140 are rigid in part, they present stiffness that is sufficient to ensure that the routing conduits are fastened properly to the endpiece 100.

Since they are flexible in part, they enable the endpiece 100 to deform so as to make it easier to connect the routing conduits.

The shapes of the cartridges 640, 650, 660, 670, 680 shown in FIGS. 30 to 34 are described below in detail.

The cartridge 640 shown in FIG. 30 does not have connection elements. More generally, it does not have any electrical component.

It is designed solely for closing the rear wall of the connector 600 and of the electrical box 260.

It is used when the electric cable or fiber optic cable coming from the local network is connected directly to the electrical accessory fitted in the electrical box 260, which occurs in particular when the electrical accessory has a DVI socket function.

In this embodiment, the rear wall 641 of the cartridge 640 is solid and, at the center of its front face, it carries a cylindrical lug 644.

Figure 31:
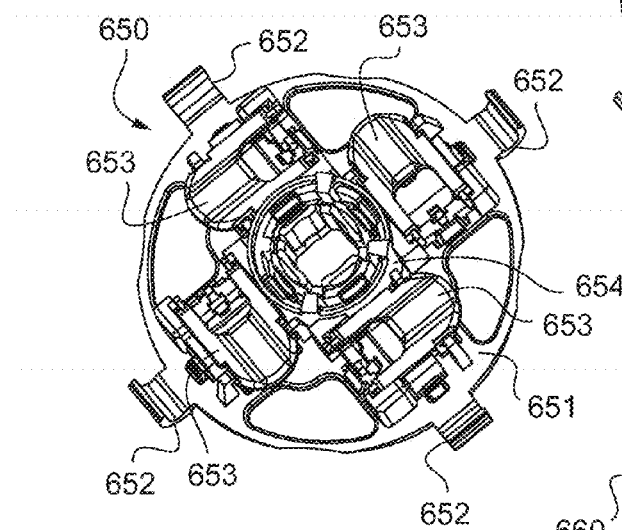

The cartridge 650 shown in FIG. 31 includes four distinct connection elements.

By way of example, it is used when the electrical accessory fitted in the electrical box 260 has a two-way switch function.

In this embodiment, the rear wall 651 of the cartridge 650 has the shape of a cross having four branches inscribed in a ring (i.e. the shape of a Celtic cross).

On each of its four branches, it carries one of the electrical connection elements.

The connection elements are not shown in FIG. 31.

However, they can be described briefly. Thus, in this embodiment, they are identical, and each of them includes an inlet terminal for connecting one of the insulated electric wires, and an outlet terminal that is accessible via the front of the rear wall 651 for connecting the pins of the electrical accessory.

The connection elements are fastened in reception housings that are insulated from one another and that are defined by partitions that project from the front face of the rear wall 651.

All of the connection elements are formed by cutting and bending a metal sheet.

Their inlet terminals could be of the automatic type. Thus, by way of example, each of the inlet terminals could include a spring blade that defines a duct for inserting and automatically blocking a stripped end of an insulated electrical wire.

Each of the inlet terminals could also be a screw terminal comprising a screw that is adapted to block and connect the insulated electric wire.

In this embodiment, in order to make the work of the installer easier, the inlet terminals are quick connection terminals, each fitted with an operating lever 653.

As shown in FIG. 31, in this embodiment, each operating lever 653 presents the shape of a rectangular plate that is mounted to pivot relative to the rear wall 651 between an open position in which it uncovers the inlet terminal so as to make it possible to connect one of the insulated electric wires thereto, and a closed position in which it blocks the electric wire in the inlet terminal.

In this embodiment, each operating lever 653 is mounted to pivot on the rear wall. In a variant, it could be mounted to pivot on the inlet terminal itself.

For this purpose, the front face of the rear wall 651 carries mounts in which pivot pins are engaged, which mounts are provided on either side of each operating lever 653.

In order to hold them in their closed position, on their edges the operating levers 653 include grooves in which teeth that are carried by snap-fastener tabs that project from the rear wall 651 are adapted to snap-fasten.

In order to cut the insulation of the insulated electric wire(s) that are fitted thereto, each inlet terminal defines sharp slots for cutting the insulation of the insulated electric wires in order to establish an electrical connection.

The connection elements are arranged on the rear wall 651 in such a manner that their outlet terminals are contiguous (i.e. situated in the proximity of one another, in this embodiment in the proximity of the center of the rear wall 651, in a cylindrical lug 654), and that their inlet terminals are situated at a distance from one another.

In addition, they are positioned in such a manner that the pivot pin of each operating lever is parallel to the branch of the cross-shaped rear wall 651 that carries it.

Figure 33:
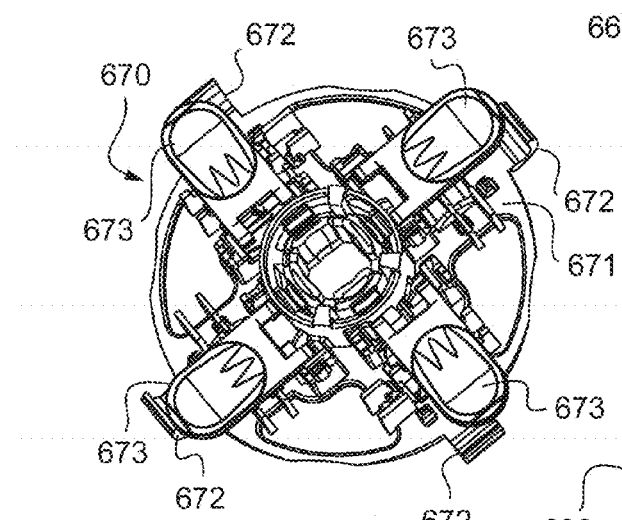

In the variant in FIG. 33, in contrast, the operating levers 673 are positioned on the rear wall 671 in such a manner that the pivot pin of each operating lever is perpendicular to the branch of the cross-shaped rear wall 671 that carries it.

The advantage of this configuration is that, when an electric wire is fitted in the inlet terminal of the connection element, and when it projects beyond either side of the operating lever 673, it is possible to cut it to the desired length after the operating lever has been lowered down, which makes the work of the installer easier.

Figure 32:
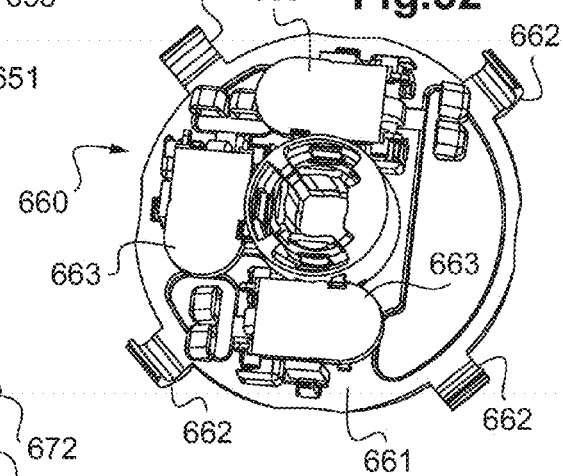

The cartridge 660 shown in FIG. 32 includes three distinct connection elements.

By way of example, it may be used when the electrical accessory fitted in the electrical box 260 has a power-outlet function.

In this embodiment, the rear wall 661 of the cartridge 660 has a T-shape inscribed in a ring.

On each of the three branches of the T-shape, it carries one of the electrical connection elements.

The connection elements are not shown in FIG. 32. They are of shapes that are identical to the shapes described with reference to FIG. 31.

Thus, each of them is fitted with an operating lever 663 that is mounted to pivot on the rear wall 661.

In this embodiment, the operating levers 663 are positioned in such a manner that the pivot pin of each operating lever is parallel to the branch of the T-shaped rear wall 661 that carries it.

Figure 34:
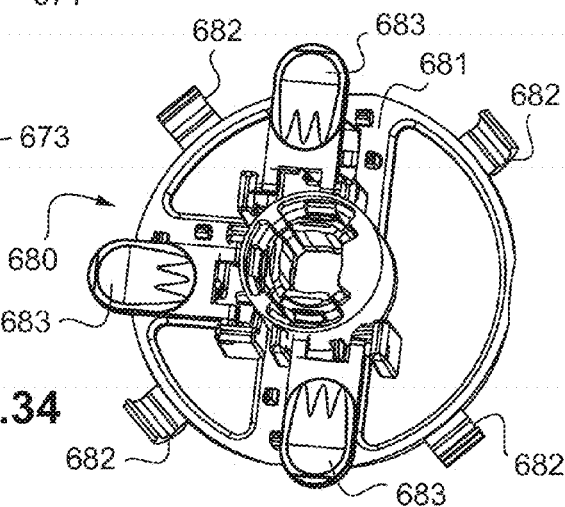
Figure 35:
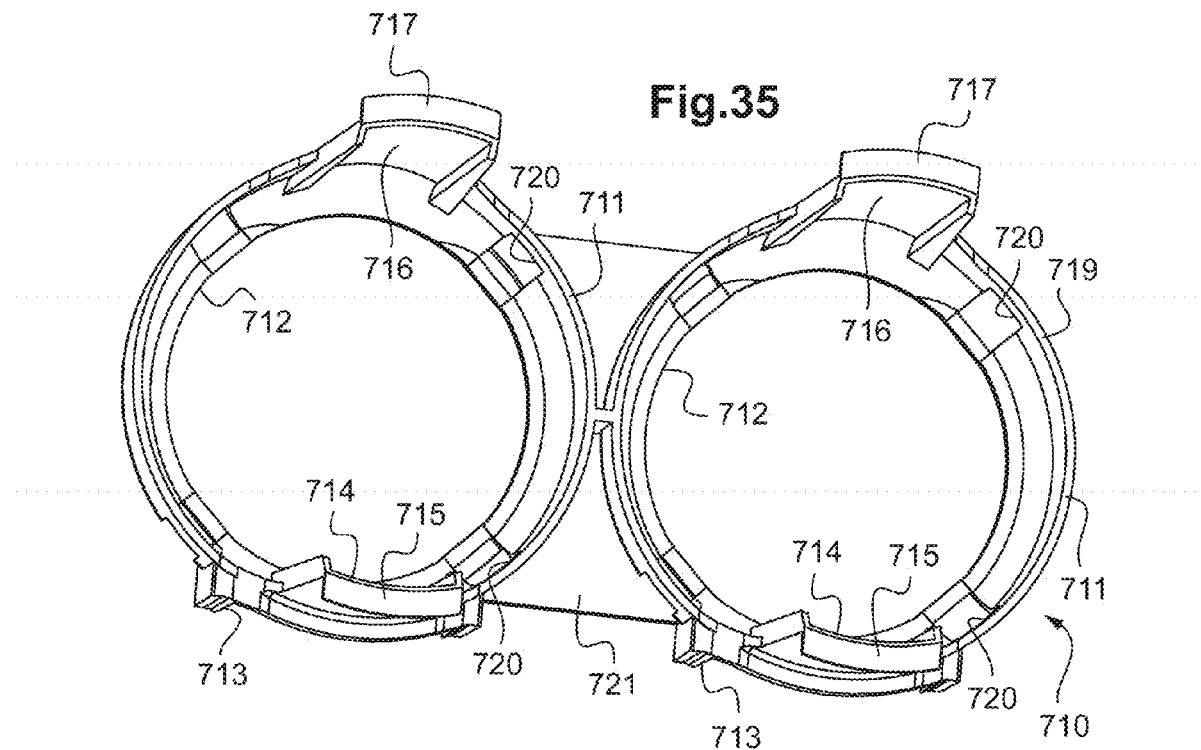
FIG. 35 is a diagrammatic perspective view of a first variant embodiment of the FIG. 29 support.

In contrast, in the variant in FIG. 34, the operating levers 683 are positioned in such a manner that the pivot pin of each operating lever is perpendicular to the branch of the T-shaped rear wall 681 that carries it.

There follows a description of how an electrical accessory is put into place in a hollow partition and is connected by means of the connector 600.

Initially, a circular opening is formed, using a hole saw, in the plasterboard of the hollow partition, so that the free end of a routing conduit can be pulled to the outside of the hollow partition, through the circular opening.

After selecting an electrical accessory for engaging in the circular opening, the installer assembles one of the cartridges 640, 650, 660, 670, 680 that is adapted to be used with the selected electrical accessory in the support 610.

The ends of the insulated electric wires that protrude from the routing conduit are then engaged through the endpiece 100 and through the inlet opening 613 of the support 610, then the end of the routing conduit is blocked in one of the tubular ducts of the endpiece 100.

After lifting up the operating levers that are carried by the selected cartridge, the installer engages the insulated electric wires in the connection elements, then the installer lowers the operating levers down into their closed positions, thereby causing the insulated electric wires to become engaged in the slots of the inlet terminal.

The connector 600 is then put into place through the circular opening formed in the plasterboard, initially by engaging it via its side from which the routing conduit emerges, then by tilting it without difficulty in the circular opening.

The connector 600 is that much easier to put into place in the hollow partition, given that, as a result of the small thickness of the peripheral wall 611 of the support 610 and as a result of the springiness of the tabs 614, 616, the installer still has access to the routing conduit(s) while the connector is being installed in the wall, so that they can be pushed back into the wall in the desired direction and more easily.

The connector 600 is considered to be in place when the rims 615, 617 of the arms 614, 616 bear against the front face of the plasterboard.

It thus remains for the installer to engage the electrical box 260 through the circular opening formed in the plasterboard, which is performed without difficulty as a result of the rails 269 that are setback in the outside face of the side wall 261 of the electrical box 260.

The electrical box is considered to be in place when its rear wall bears against the support 610.

FIGS. 35 to 38 show two variant embodiments of the connector 600 shown in FIG. 29.

In these two variants, the supports 710; 810 present shapes that are different from the support 610, since they are specifically designed to receive, between their arms, multi-station boxes, i.e. boxes that are adapted to receive two or three electrical accessories as appropriate.

Figure 36:
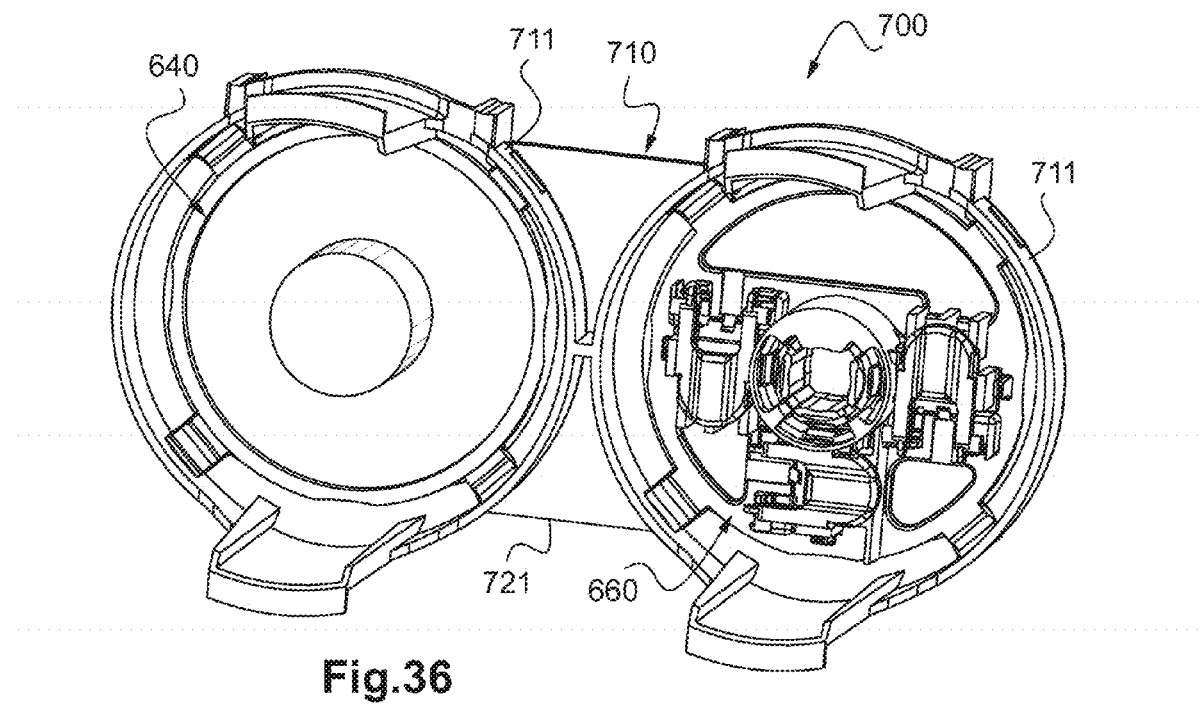
FIG. 36 is a diagrammatic perspective view of the FIG. 35 support assembled together with two end walls that are shown in FIGS. 30 and 33.

As shown in FIGS. 36 and 38, in these two variants, the supports 710; 810 of the connectors 700; 800 are adapted to receive two or three cartridges 640, 650, 660, 670, 680 as appropriate, which cartridges are identical to the cartridges shown in FIGS. 30 to 34.

For this purpose, the supports 710; 810 define two or three distinct stations as appropriate, that are identical to the support 610 shown in FIG. 29, and that are joined in pairs via plane junction walls 721; 821.

In particular, each station thus presents a main opening 712; 812 for receiving a cartridge, and an inlet opening 713; 813 for the insulated electric wires.

In these embodiments, the front edges of the peripheral walls 711; 811 of the supports are coplanar, and the arms 714, 716; 814, 816 of the supports extend from the front edges, towards the front.

Preferably, provision is made for each of the supports 710; 810 to include at least three distinct arms. In practice, in these embodiments, each station includes two distinct arms 714, 716; 814, 816 having free ends 715, 717; 815, 817 that are bent so as to be able to catch on the front of the plasterboard.

In these embodiments, each station includes its own inlet opening 713; 813 for the insulated electric wires, but, in a variant, it is possible to envisage one single inlet opening that is common to the two or three stations.

In another variant of the invention that is not shown, provision could be made for the shapes of the arms and of their catch means for catching on the wall to be different from the shapes of the arms and of the catch means shown in the figures.

Thus, the arms could be curved a little towards the outside so as to generate a spring effect that enables them to catch more firmly on the edge of the circular opening formed in the plasterboard.

In another variant, at their centers, the arms could curve a little towards the inside, so as to enable them to pinch the electrical box when the electrical box is engaged in the wall.

The catch means themselves could be in the form merely of a flexible layer that is overmolded on the outside faces of the arms, in which configuration the connector is fastened to the wall merely by friction between the flexible layer and the edge of the opening formed in the plasterboard.

The catch means could also be formed by the arms themselves, providing the arms are arranged in such a manner that the installer is forced to flex them towards each other in order to engage the connector in the wall so that, when the installer releases them, the arms bear firmly against the edge of the opening formed in the plasterboard.

The catch means could also be in the form of snap-fastener tabs that are cut out in the arms and that come to catch on the rear of the plasterboard when the rims of the tabs come to bear against the front face of the plasterboard.

The catch means could also be in the form of serrations that are adapted to anchor in the edge of the circular opening formed in the plasterboard.

In addition, although the inlet opening provided in the base for passing the electric wires presents a closed outline in the figures, in a variant provision could be made for it to present an open outline. It could thus be formed by a notch provided in the peripheral rim of the base, in which configuration the routing conduit would be blocked against the edge of the notch and would then be held in position by the rear wall of the electrical box.

The invention claimed is:

1. An assembly, comprising:
   a connector for flush mounting in a wall, said connector comprising
      a base that defines an inlet opening for at least one electrical conductor, and that presents a front edge, and
      at least one connection element that is fastened to the base and that includes an inlet terminal for connecting said electrical conductor, and an outlet terminal that is accessible via the front of the base for connecting at least one electrical accessory,
      two distinct arms that extend from the base, mainly at the front of the front edge of the base, and having free ends that present catch means for catching on the wall; and
   an electrical box for receiving an electrical accessory and including a side wall that externally presents at least two grooves for passing the arms of the connector, and that is closed at the rear by a rear wall, the rear wall presenting at least one access opening for accessing the outlet terminals of the connection elements of the connector.

2. The assembly according to claim 1, wherein the base includes a rear wall that is bordered at the front by a peripheral rim.

3. The assembly according to claim 1, wherein only two arms are provided, situated opposite each other relative to the center of the base.

4. The assembly according to claim 1, wherein the arms project in parallel directions from the front edge of the base.

5. The assembly according to claim 1, wherein said inlet opening is situated in alignment with a first of the arms.

6. The assembly according to claim 5, wherein said base includes two notches that are situated on either side of a second of the two arms and that are contiguous with the second arms.

7. The assembly according to claim 1, wherein said catch means are formed by the free ends of the arms, which free ends are curved outwards.

8. The assembly according to claim 1, wherein an endpiece is provided that defines at least one passage for passing said electrical conductor, and that includes a mounting portion for mounting it on the base, on the axis of said inlet opening, and at least one securing portion for securing a routing conduit that houses said electrical conductor.

9. The assembly according to claim 8, wherein the mounting portion comprises a tubular duct that externally presents a peripheral groove that is engaged on the edge of the inlet opening of the base.

10. The assembly according to claim 8, wherein the mounting portion comprises a tubular duct and at least two snap-fastener tabs that are adapted to catch on the edge of the inlet opening of the base.

11. The assembly according to claim 8, wherein the mounting portion is shaped to allow the endpiece at least one freedom to move in pivoting relative to the base, about an axis that slopes relative to the axes on which the arms extend.

12. The assembly according to claim 11, wherein the mounting portion is shaped to co-operate with said inlet opening to form a ball-and-socket connection.

13. The assembly according to claim 11, wherein the base includes indexer means for blocking the pivoting of the endpiece relative to the base.

14. The assembly according to claim 8, wherein the mounting portion is shaped so as to block the endpiece in stationary manner relative to the base, and wherein each securing portion includes a junction zone at said mounting portion that is flexible manually.

15. The assembly according to claim 8, wherein the mounting portion includes slide means that make it possible to bring the endpiece onto the axis of the inlet opening, and snap-fastener teeth that make it possible to block the endpiece in this position relative to the inlet opening.

16. The assembly according to claim 8, wherein each securing portion comprises a tubular duct that is provided internally with holder means for holding the routing conduit.

17. The assembly according to claim 16, wherein each tubular duct comprises a flexible portion that is extended at its free end by a rigid collar.

18. The assembly according to claim 16, wherein the tubular ducts of the two securing portions extend side-by-side, parallel to each other.

19. The assembly according to claim 8, wherein at least two distinct securing portions are provided.

20. The assembly according to claim 8, wherein each securing portion comprises a succession of tubes of different diameters.

21. The assembly according to claim 8, wherein said endpiece is formed as a single piece by molding.

22. The assembly according to claim 1, wherein the base includes a rear wall that, on its front face, carries partitions, the partitions defining insulated reception housings that receive said connection elements.

23. The assembly according to claim 1, wherein the inlet terminal of each connection element presents at least one slot having edges that are sharp so as to cut the insulation of the electrical conductors.

24. The assembly according to claim 23, wherein the inlet terminal of each connection element is fitted with an operating lever that is adapted to force the electrical conductor into said slot.

25. The assembly according to claim 24, wherein, since the base includes a rear wall, each operating lever is mounted to pivot about an axis that is parallel to the rear wall.

26. The assembly according to claim 25, wherein in orthogonal projections onto the plane of the front face of the rear wall, the pivot axis of at least one operating lever and the axis of the inlet opening are parallel.

27. The assembly according to claim 1, wherein a plurality of connection elements are provided that are arranged in such a manner that their outlet terminals are contiguous, and that their inlet terminals are situated at a distance from one another.

28. The assembly according to claim 27, wherein a cap is provided for insulating said connection elements, which cap includes fastener means for fastening to the base and at least one access opening for accessing one of the outlet terminals of the connection elements.

29. The assembly according to claim 1, wherein the base defines at least two distinct stations in each of which an inlet opening and at least two connection elements are provided, and wherein at least three distinct arms are provided.

30. The assembly according to claim 1, wherein the side wall of the electrical box is closed at the rear by a rear wall that presents at least one access opening for accessing the outlet terminals of the connection elements of the connector, and wherein said access opening is closed by a diaphragm that is detachable or can be knocked out.

31. The assembly according to claim 1, wherein the edge of said access opening is covered by a sealing gasket.

32. The assembly according to claim 1, wherein the edge of said access opening is covered by a sealing gasket and wherein said diaphragm is overmolded on a portion of the rear wall so as to present firstly a bulge that extends internally around the edge of said access opening so as to form said sealing gasket, and secondly a breakable line of weakness that internally extends the edge of said bulge.

33. The assembly according to claim 1, wherein the side wall of the electrical box is bordered at the front by an outer collar that is interrupted for passing the arms of the connector.

34. A method of mounting a connector of an assembly according to claim 1 in a cavity formed in a wall, the method comprising:
    threading an electrical conductor through the inlet opening of the base of the connector;
    connecting said electrical conductor to the inlet terminal of the connection element of the connector; and
    engaging the connector in said cavity in such a manner that the catch means provided at the free ends of the arms catch on the wall.

35. The method of mounting an assembly according to claim 1 in a cavity formed in a wall, the method comprising:
    a step of mounting the connector in said cavity which comprises:
    threading an electrical conductor through the inlet opening of the base of the connector;
    connecting said electrical conductor to the inlet terminal of the connection element of the connector; and
    engaging the connector in said cavity in such a manner that the catch means provided at the free ends of the arms catch on the wall; then
    a step of mounting the electrical box in said cavity, by engaging the grooves provided in the side wall of the electrical box on the arms of the connector so that the access opening provided in said rear wall is positioned facing the outlet terminals of the connection elements of the connector.

36. An assembly, comprising:
    a connector support for flush mounting in a wall, said connector support comprising
        a peripheral wall that defines at least one main opening for receiving a cartridge, that defines at least one side notch or inlet opening for at least one electrical conductor, and that presents a front edge,
        catch means for catching said cartridge in said main opening,
        at least two distinct arms that extend from the peripheral wall, mainly at the front of the front edge of the peripheral wall, and having free ends that present catch means for catching on the wall; and
    an electrical box for receiving an electrical accessory and including a side wall that externally presents at least two grooves for passing the arms of the connector, and that is closed at the rear by a rear wall, the rear wall presenting at least one access opening for accessing the outlet terminals of the connection elements of the connector.

37. The assembly according to claim 36, wherein the peripheral wall defines at least two identical main openings, and wherein at least three distinct arms are provided.

38. The assembly according to claim 36, further comprising:
    at least one connector cartridge for flush mounting in a wall, said connector cartridge, comprising a rear wall, catch means for catching the rear wall on the support, and at least one connection element that is fastened to the rear wall and that includes an inlet terminal for connecting an electrical conductor, and an outlet terminal that is accessible via the front of the rear wall for connecting at least one electrical accessory, said connector cartridge being fastened in the main opening of said support, such that the support and the rear wall of the connector cartridge co-operate with each other to form a single base.

39. The assembly according to claim 38, wherein the catch means for catching the rear wall on the support are unlockable snap-fastener means.

* * * * *